United States Patent
Gerges et al.

(10) Patent No.: US 11,029,819 B2
(45) Date of Patent: Jun. 8, 2021

(54) SYSTEMS AND METHODS FOR SEMI-AUTOMATED DATA TRANSFORMATION AND PRESENTATION OF CONTENT THROUGH ADAPTED USER INTERFACE

(71) Applicant: Microsoft Technology Licensing, LLC, Redmond, WA (US)

(72) Inventors: Hany Grees Gerges, Bothell, WA (US); Kaushik Ramaiah Narayanan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/420,781

(22) Filed: May 23, 2019

(65) Prior Publication Data

US 2020/0371647 A1    Nov. 26, 2020

(51) Int. Cl.
| | | |
|---|---|---|
| G06F 3/0482 | (2013.01) | |
| G06F 40/258 | (2020.01) | |
| G06F 16/438 | (2019.01) | |
| G06F 40/151 | (2020.01) | |

(52) U.S. Cl.
CPC ........ G06F 3/0482 (2013.01); G06F 16/4393 (2019.01); G06F 40/151 (2020.01); G06F 40/258 (2020.01)

(58) Field of Classification Search
CPC combination set(s) only.
See application file for complete search history.

(56) References Cited

U.S. PATENT DOCUMENTS

| | | | | |
|---|---|---|---|---|
| 8,005,825 | B1 * | 8/2011 | Ghosh | G06F 16/334 |
| | | | | 707/723 |
| 9,026,915 | B1 * | 5/2015 | Ehlen | G06F 40/166 |
| | | | | 715/728 |
| 9,875,246 | B2 * | 1/2018 | Sunada | G06F 16/245 |
| 9,959,260 | B2 * | 5/2018 | Ehlen | G06F 40/103 |

(Continued)

OTHER PUBLICATIONS

Klampfl, et al., "Unsupervised Document Structure Analysis of Digital Scientific Articles", In International Journal on Digital Libraries, vol. 14, No. 3-4, Aug. 2014, pp. 83-99.

(Continued)

*Primary Examiner* — Scott T Baderman
*Assistant Examiner* — Benjamin Smith

(57) ABSTRACT

The present disclosure relates to systems and methods that are configured to semi-automate data transformation processing so that content can be transformed, from one type of electronic document, for presentation in another type of electronic document. For instance, data transformation suggestions, for transforming content from a first form into a presentation form (second form), may be generated and presented to a user through an improved user interface of an application/service that is used to display the first form of the content. The improved user interface provides a new user interface menu to manage the data transformation suggestions and/or export/import processing of data from one type of electronic document to another. Based on user selection of the confirming data transformation suggestions through the user interface menu, a presentation document is automatically generated on behalf of the user, for example, in a different application/service.

20 Claims, 12 Drawing Sheets

(56) References Cited

U.S. PATENT DOCUMENTS

| | | | |
|---|---|---|---|
| 10,146,798 B2* | 12/2018 | Nauerz | G06F 16/5866 |
| 10,146,800 B2* | 12/2018 | Nauerz | G06F 16/4393 |
| 10,209,866 B2* | 2/2019 | Johnston | G06F 3/04817 |
| 10,460,023 B1* | 10/2019 | Shriver | G06F 40/14 |
| 10,573,038 B2* | 2/2020 | Gilbert | G06F 40/103 |
| 10,733,372 B2* | 8/2020 | Kumar | G06F 40/186 |
| 2008/0092050 A1* | 4/2008 | Wu | G06F 16/489 715/730 |
| 2009/0112652 A1* | 4/2009 | Kelsey | G06Q 10/06 705/7.13 |
| 2010/0309436 A1* | 12/2010 | Allen, Jr. | G06F 16/4393 353/21 |
| 2011/0196862 A1* | 8/2011 | Bergman | G06F 16/4393 707/728 |
| 2012/0117089 A1* | 5/2012 | Matrat | G06F 16/338 707/752 |
| 2012/0329026 A1* | 12/2012 | Lewolt | G06Q 10/101 434/322 |
| 2013/0080867 A1* | 3/2013 | Vandervort | G06F 16/94 715/205 |
| 2014/0282013 A1* | 9/2014 | Amijee | G06F 3/0482 715/732 |
| 2015/0007005 A1* | 1/2015 | Edge | G06F 3/04847 715/205 |
| 2015/0234800 A1* | 8/2015 | Ehlen | G06F 3/0482 715/202 |
| 2016/0098175 A1* | 4/2016 | Sunada | G06F 16/245 715/765 |
| 2016/0098405 A1* | 4/2016 | Gorbansky | G06F 16/24578 707/749 |
| 2016/0103575 A1* | 4/2016 | Nauerz | G06F 16/5866 715/730 |
| 2016/0103854 A1* | 4/2016 | Nauerz | G06F 16/58 707/706 |
| 2016/0306505 A1* | 10/2016 | Vigneras | G06Q 10/10 |
| 2016/0371868 A1* | 12/2016 | Gilbert | G06F 40/137 |
| 2017/0220217 A1* | 8/2017 | Gilmore | G06F 16/252 |
| 2017/0316091 A1* | 11/2017 | Edge | G06F 40/151 |
| 2018/0089156 A1* | 3/2018 | Kapoor | G06F 16/256 |
| 2018/0095945 A1* | 4/2018 | Hosabettu | G06F 16/38 |
| 2018/0113579 A1* | 4/2018 | Johnston | G06F 16/743 |
| 2018/0129634 A1* | 5/2018 | Sivaji | G06F 40/186 |
| 2018/0181549 A1* | 6/2018 | Hileman | G06F 16/4393 |
| 2018/0196784 A1* | 7/2018 | Kumar | G06F 40/186 |
| 2018/0330000 A1* | 11/2018 | Noble | G09B 7/02 |
| 2018/0349450 A1* | 12/2018 | Smyth | G06F 3/0485 |
| 2019/0073384 A1* | 3/2019 | Nauerz | G06F 16/951 |
| 2019/0087780 A1* | 3/2019 | Cerqueira | G06K 9/00456 |

OTHER PUBLICATIONS

"International Search Report and Written Opinion Issued in PCT Application No. PCT/US20/028171", dated Jul. 14, 2020, 09 Pages.

* cited by examiner

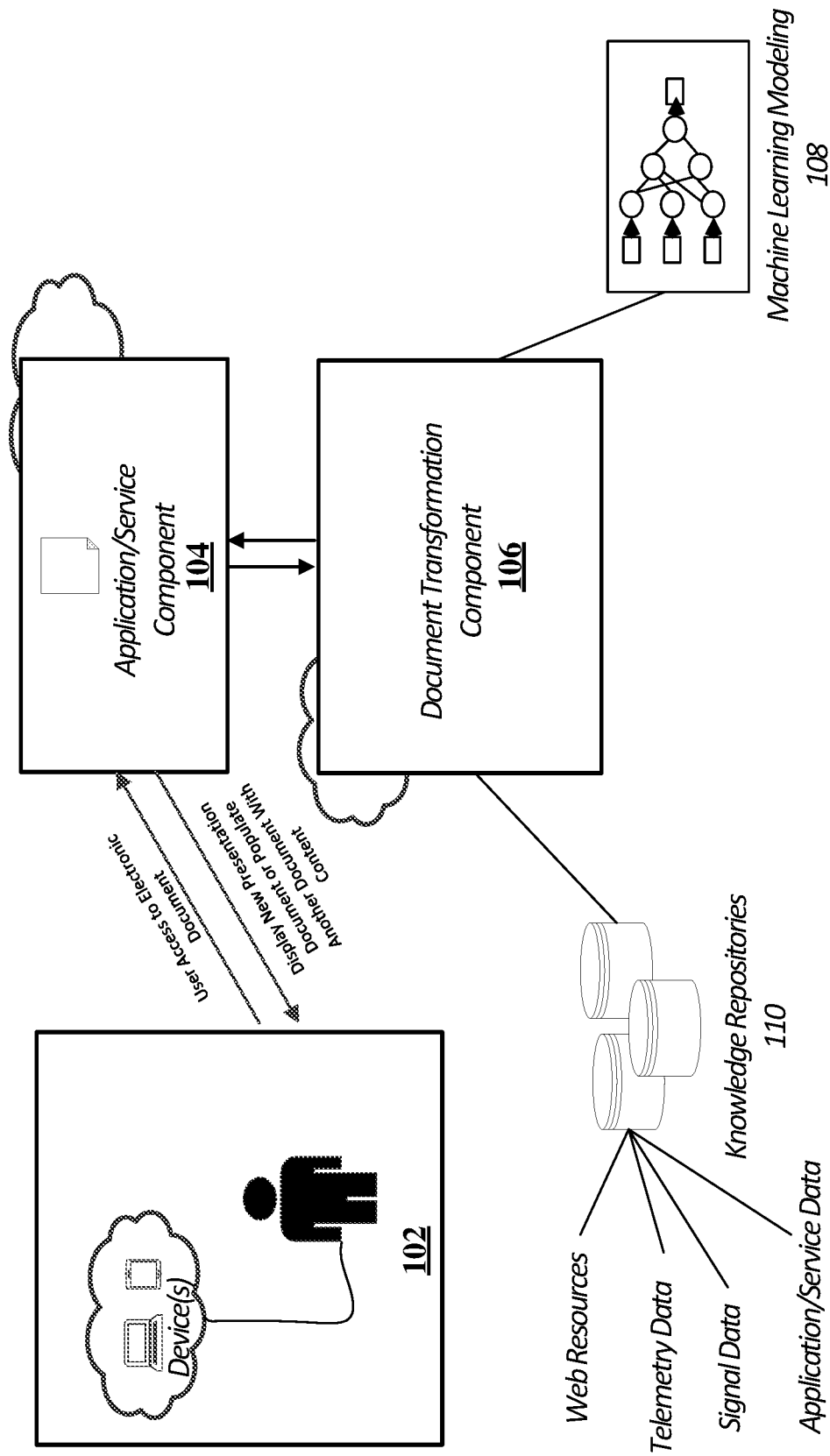

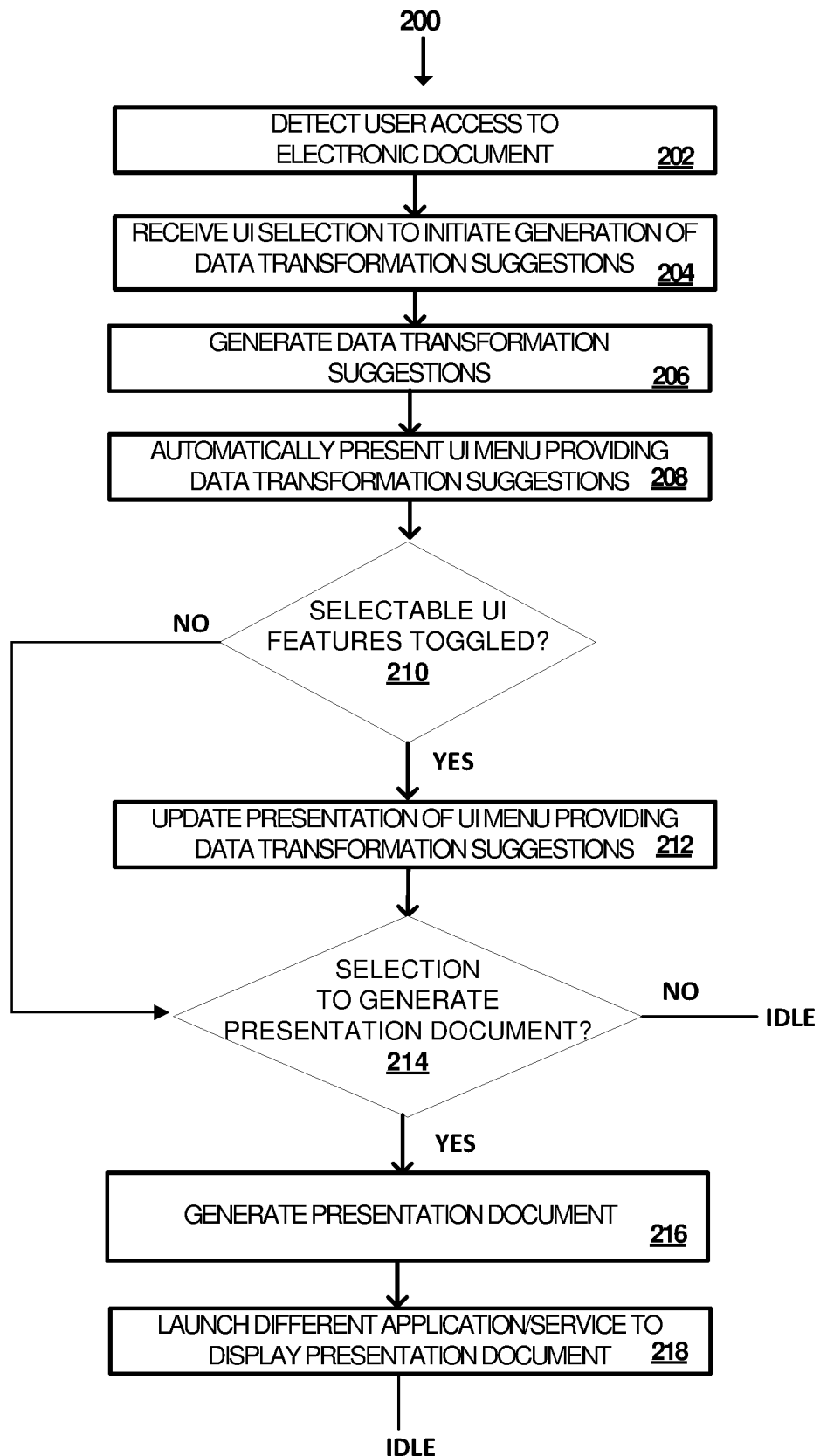

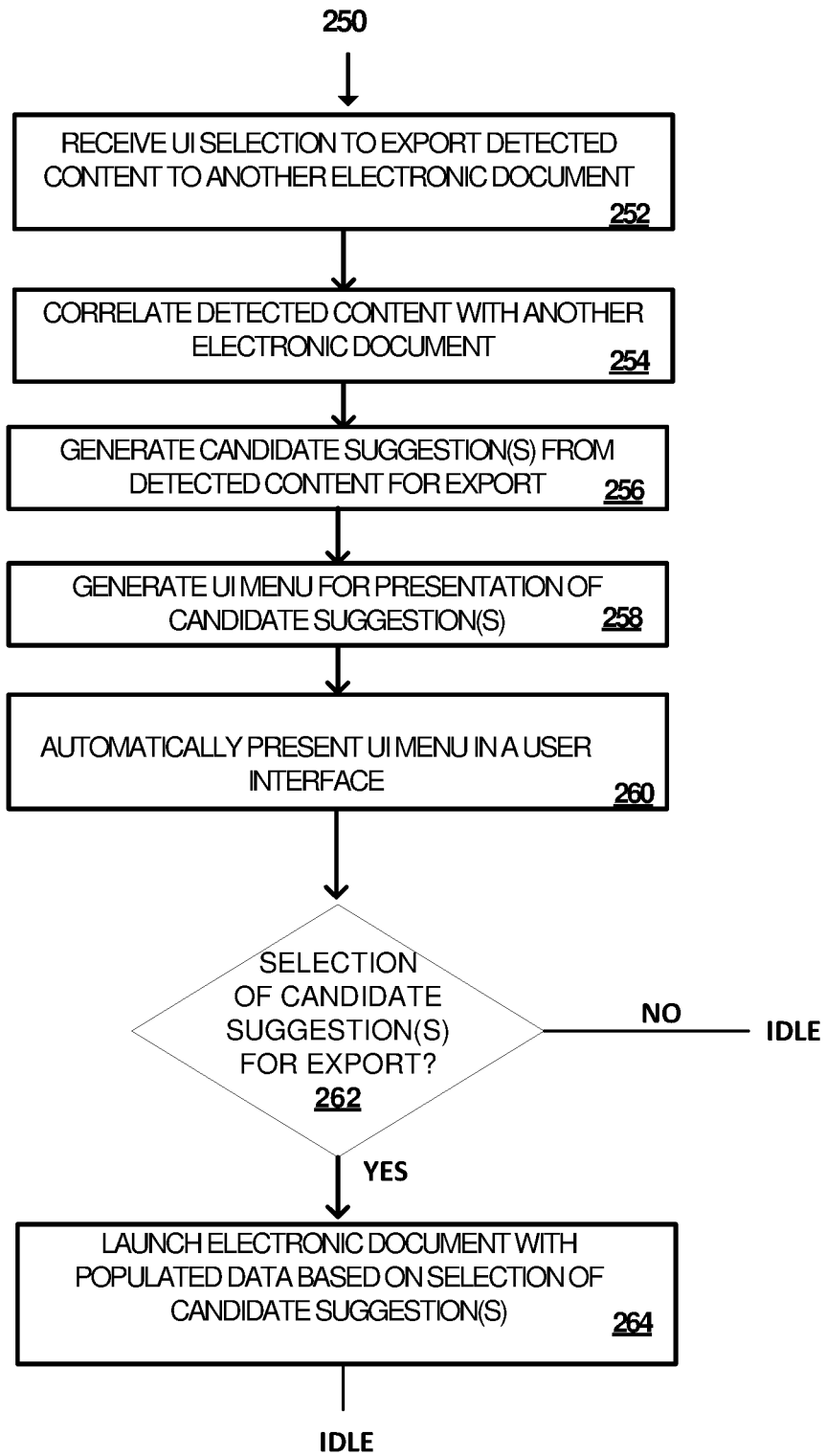

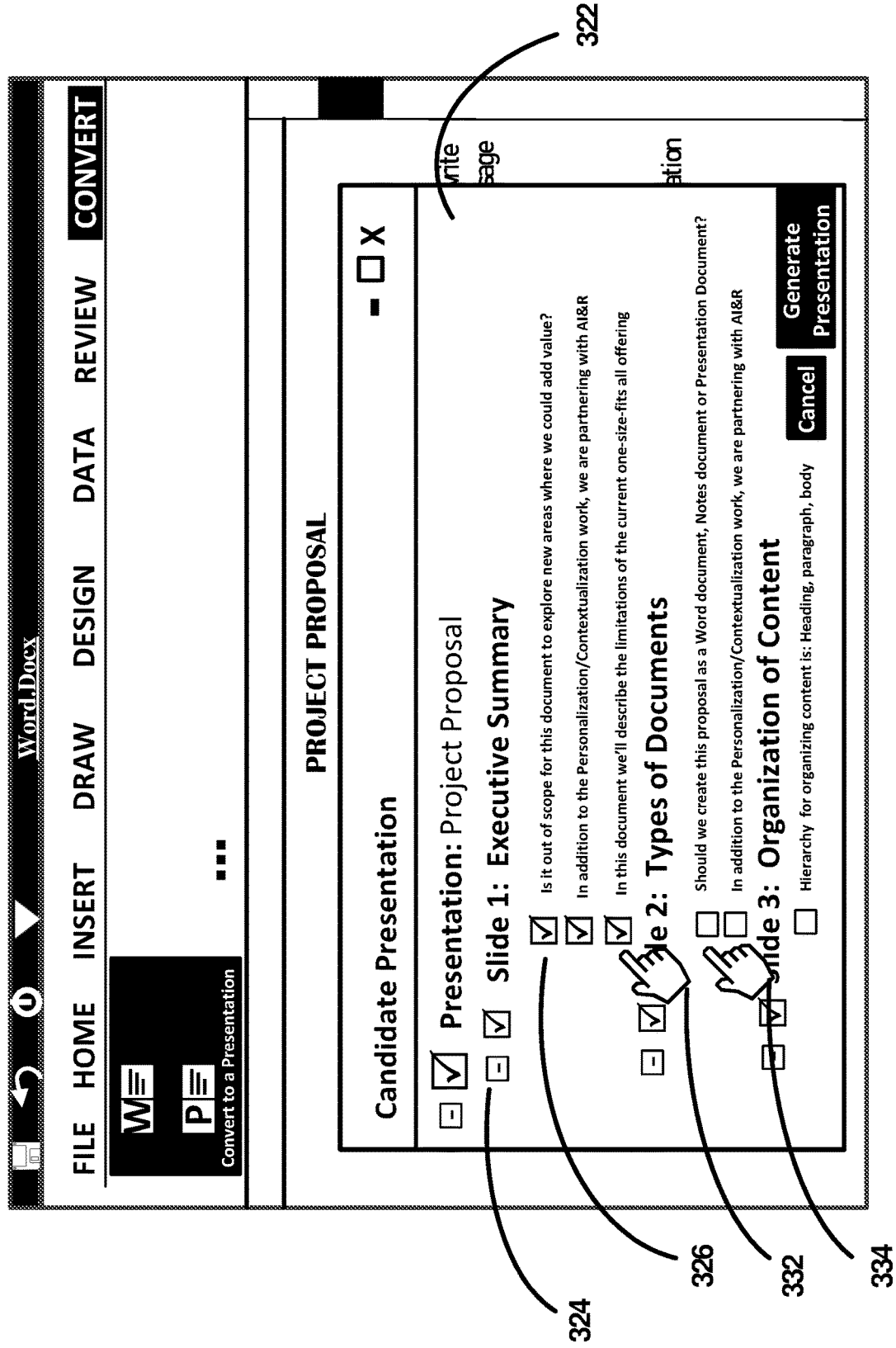

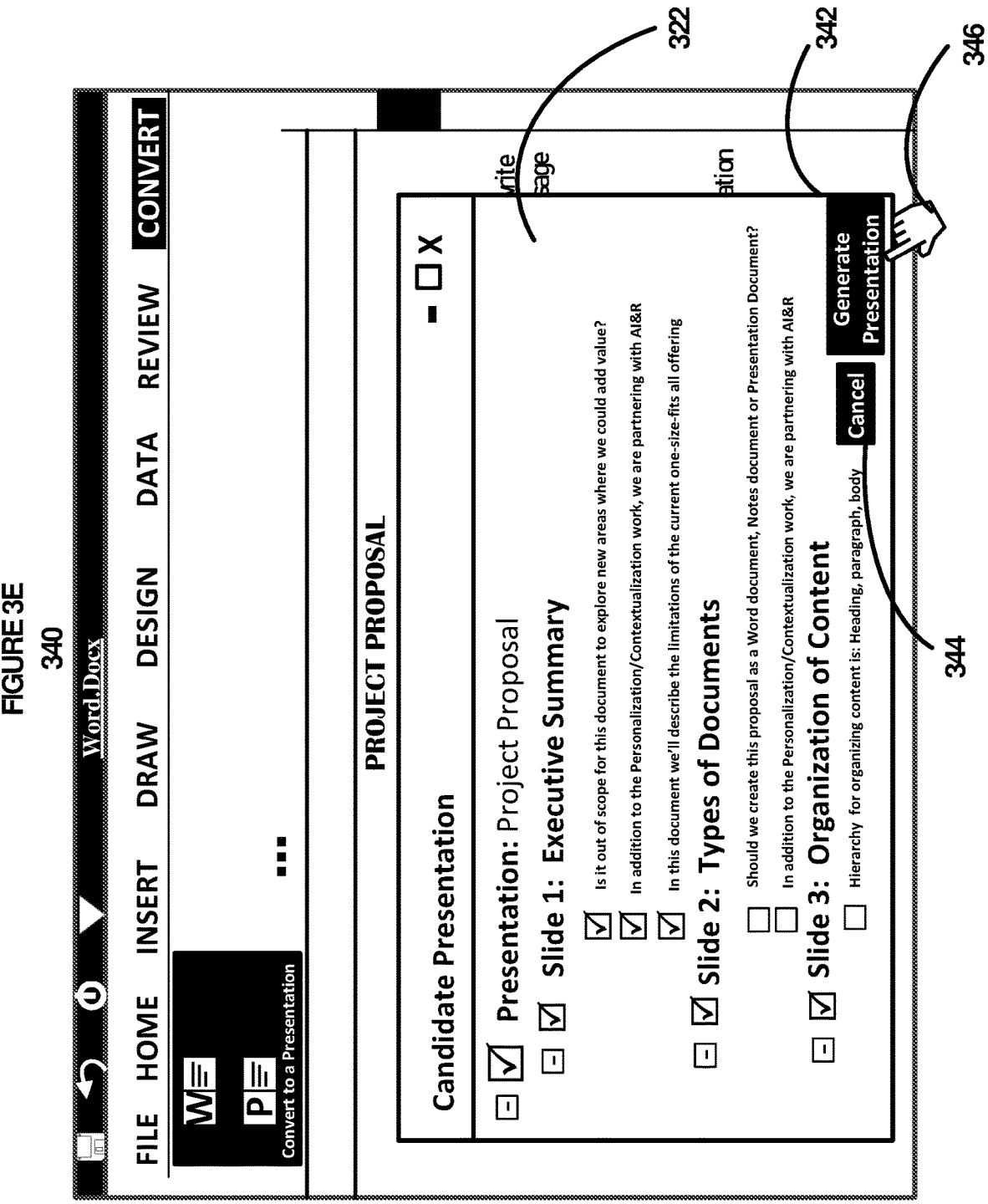

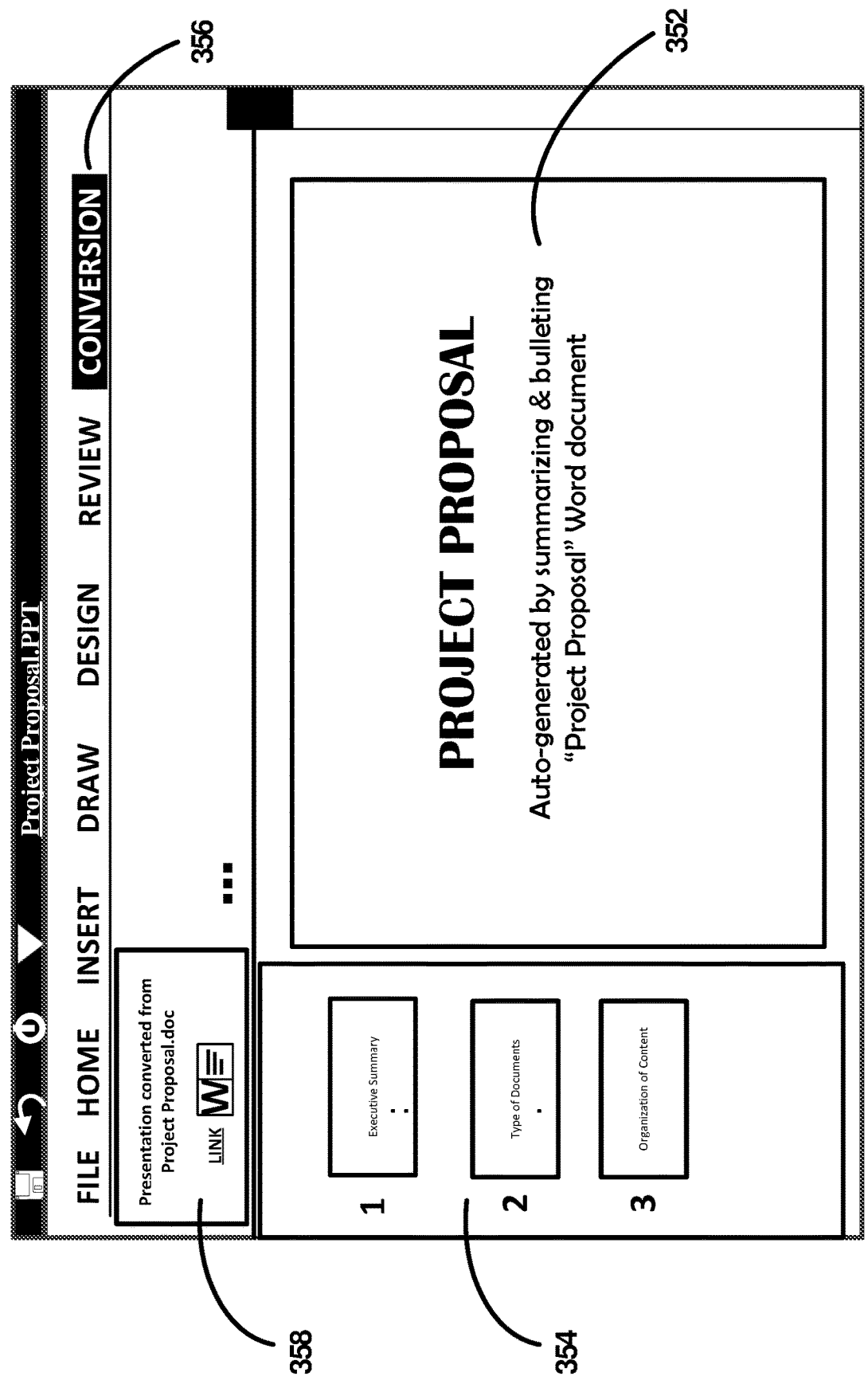

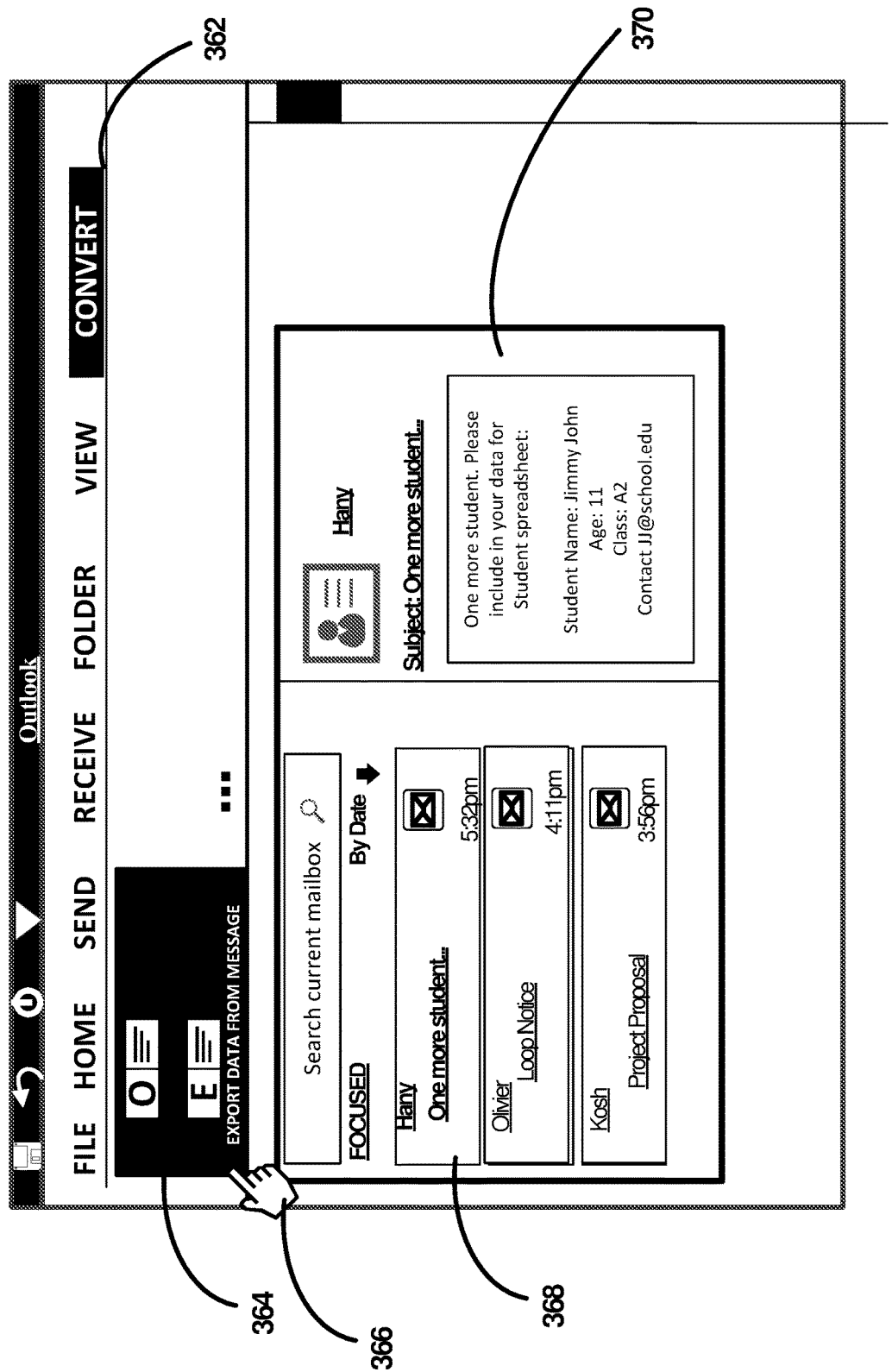

SYSTEMS AND METHODS FOR SEMI-AUTOMATED DATA TRANSFORMATION AND PRESENTATION OF CONTENT THROUGH ADAPTED USER INTERFACE

BACKGROUND

User's waste a lot of time when they need to move data between different applications/services because traditional processing configurations lack efficiency and synergy. Moving data between applications/services is a cognitive process that involves some level of intelligence. Current artificial intelligence (AI) solutions may not be in parity with human intelligence when it comes to processing unstructured data. As such, users are typically required to execute numerous manual operations to direct and instruct computing devices on how to move data between applications/services and specifically what data they want re-located. This causes a processing burden on computing devices (e.g., tying up bandwidth and processing resources) as well as limits user productivity when using specific applications/services, where a user's time, attention and intelligence is required to be applied to complete such tasks.

Taking such technical problems, a step further, automating a data transfer of content from one application/service to another presents a quandary because traditional AI is not accurate enough to determine which content is most important and how to prioritize that content for a user in a transformed manner. For instance, user's typically type up word processing documents and need to present data from that word processing document to other users. Simply importing all the data from a word document into a presentation document is not efficient from a processing standpoint and also significantly burdens a user because the user has to sift through the data and reorganize the data, including adding and removing content, to present the data in a manner that they see is most fit.

Additional technical issues exist where traditional transfer of content between application/services is a basic processing operation that does not truly reflect the context of a document that content is being transferred to. For instance, specific portions of content for transfer are not traditionally analyzed during copy/paste operations. This limits traditional systems/services, where such systems/services are unable to enhance content for presentation in another type of document. For instance, traditional systems are unable to identify related content that may be useful to a document or identify design elements that may present content in a new way.

SUMMARY

In view of the foregoing technical challenges, the present disclosure relates to systems and methods that are configured to semi-automate data transformation processing so that content can be transformed, from one type of electronic document, for presentation in another type of electronic document. For instance, data transformation suggestions, for transforming content from a first form into a presentation form (second form), may be generated and presented to a user through an improved user interface of an application/service that is used to display the first form of the content. The improved user interface provides a new user interface menu to manage the data transformation suggestions and/or export/import processing of data from one type of electronic document to another. Based on user selection of the confirming data transformation suggestions through the user interface menu, a presentation document is automatically generated on behalf of the user, for example, in a different application/service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary process flow providing exemplary components for automated data transformation of content for presentation as described herein, with which aspects of the present disclosure may be practiced.

FIGS. 2A-2B illustrates exemplary methods related to automated data transformation provided through an improved user interface, with which aspects of the present disclosure may be practiced.

FIGS. 3A-3H illustrate exemplary processing device views associated with user interface examples for data transformation and adapted presentation of content, with which aspects of the present disclosure may be practiced.

DETAILED DESCRIPTION

Figure 3A:
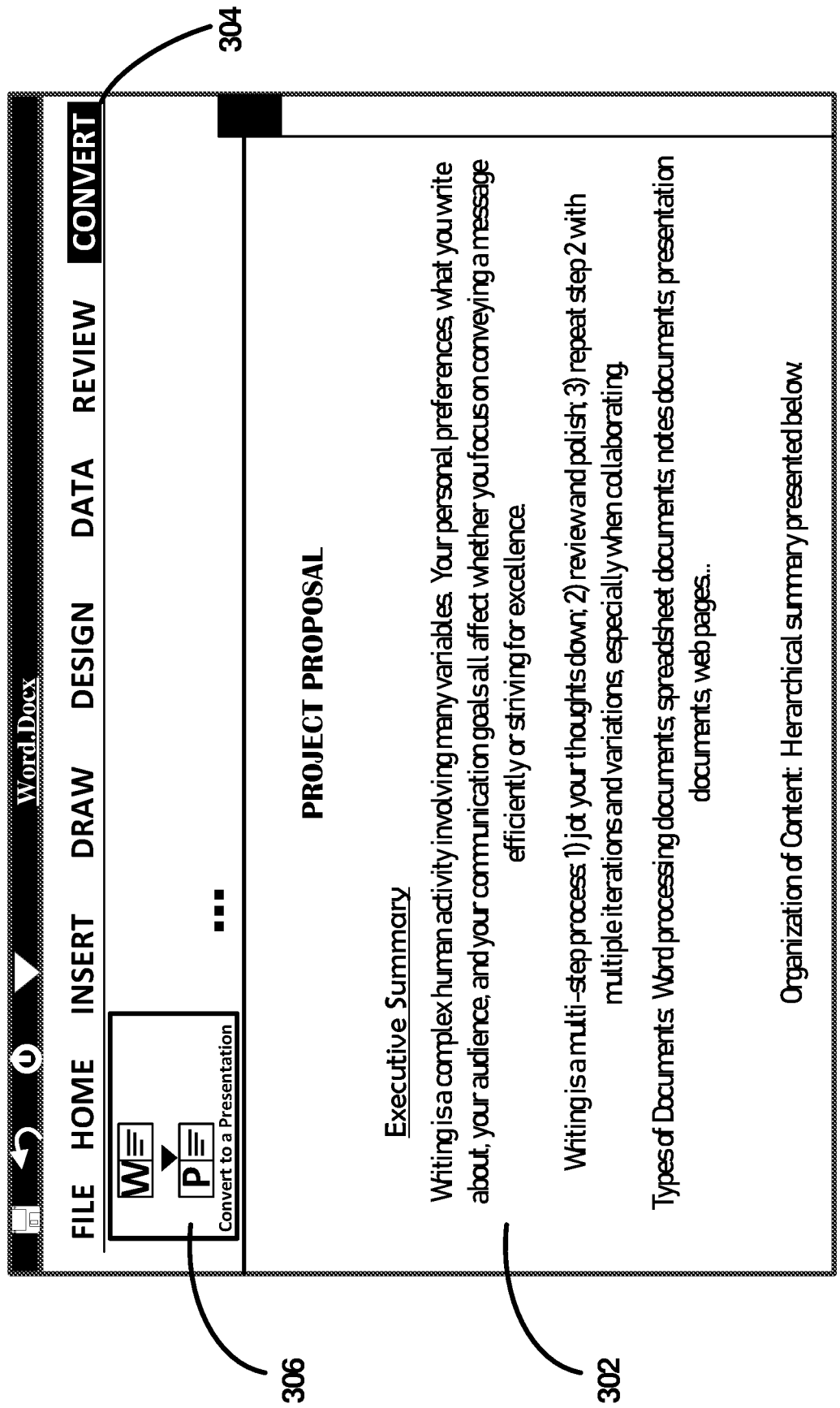

The present disclosure relates to systems and methods that are configured to semi-automate data transformation processing so that content can be transformed, from one type of electronic document, for presentation in another type of electronic document. For instance, data transformation suggestions, for transforming content from a first form into a presentation form (second form), may be generated and presented to a user through an improved user interface of an application/service that is used to display the first form of the content. The improved user interface provides a new user interface menu to manage the data transformation suggestions and/or export/import processing of data from one type of electronic document to another. Based on user selection of the confirming data transformation suggestions through the user interface menu, a presentation document is automatically generated on behalf of the user, for example, in a different application/service.

In examples described herein, content from a first type of electronic document (e.g., word processing document) is transformed and adapted for presentation in a second type of electronic document (e.g., slide-based presentation document). For example, content of a word processing document is evaluated and transformed into a slide-based presentation document. In some instances, different types of electronic documents may be presented by the same application/service. In other instances, different types of electronic documents may each be associated with a different type of application/service (e.g., data transformation from word processing application/service to slide-based presentation application/service). In further examples, content from multiple different electronic documents may be correlated for data transformation to create a presentation electronic document that aggregates content across the different electronic documents. As a non-limiting example, candidate slide suggestions, for transforming content of a word processing document into a slide-based presentation form, may be generated and presented to a user through an improved user interface of an application/service that is used to display the first form of the content (e.g., word processing application/service). Automated generation of a presentation document (e.g., slide-based presentation document) may trigger launching of a second application/service (e.g., slide-based presentation application/service) that displays an automatically generated presentation document (e.g., slide-based presentation document) on behalf of a user.

The improved user interface provides a new user interface menu to manage data transformation suggestions (e.g., candidate slide suggestions). While the user interface menu and data transformation suggestions are automatically generated on behalf of a user, the user, through selectable features of the user interface menu, is able to semi-automate the presentation creation process by confirming which data transformation suggestions they wish to include in a created presentation document. Based on user selection of the data transformation suggestions through the user interface menu, a presentation document is automatically generated and automatically presented, on behalf of the user, for example, in a different application/service. In this way data transformation processing and cross-application/service interfacing is greatly improved to enhance processing efficiency and usability of applications/services, including those available across a distributed application/service platform, and associated computing devices.

The data transformation suggestions are automatically generated based on programmed code that tailored to evaluate content and metadata of an electronic document, trained machine learning modeling, or a combination thereof. Data transformation suggestions are automatically provided, on behalf of a user, through the new user interface menu. For example, machine learning modeling is created and trained to organize content of an electronic document and rank the content for importance so that hierarchical designations of specific content can be achieved. During execution, programmed code and/or machine learning modeling may be configured to execute processing operation that comprise but are not limited to: determining a document type for an electronic document; detecting heading information for the content of the electronic document; determining sections of the electronic document based on the detected heading information; determining keywords in heading information; extracting content portions from the determined sections; determining keywords in individual content portions; ranking importance of individual content portions within the determined sections; identifying related content; identifying whether citations should be added as well as formatting data for citations; and generating the data transformation suggestions based on the determined sections, the ranking of importance of the individual content portions within the determined sections and applied intelligence gained through training and support data (e.g., collected signal data, telemetry data, data from web-based resources).

In another example, machine learning modeling is created and trained to identify keyword phrases that are then plugged into a search query to obtain links to related documents. Further related documents are then parsed for these keywords and relevant content sections are then presented through a user interface, which enables user to easily drag and drop related content into their presentation documents for further enhancement. Furthermore, data transformation processing may be configured to automatically add citations on behalf of a user where appropriate. Documents searched and accessed to find related content, provide citations, etc., are not limited to a specific document type.

Data transformation suggestions may organize and transform content of an electronic document into suggestions, for example, for inclusion in a slide-based presentation of the content (e.g., slide-based presentation document). In one example, the user interface menu providing the data transformation suggestions comprises: selectable user interface features for selecting candidate slides that are pre-populated with slide titles based on determined sections within the electronic document, and selectable user interface features for sub-content of the candidate slides that are pre-populated with content based on a ranking of importance of the individual content portions within the determined sections. Further functionality and user interface elements of new user interface menus are subsequently described in the latter description of the present disclosure.

Furthermore, non-limiting examples described herein extend to those where an improved user interface is configured to surface representations of back-end processing, which correlates data in one electronic document with data of another electronic document. This enables content to be intelligently exported from one electronic document and imported into another electronic document in a contextual manner that the content is adapted for presentation in a different application/service. In such examples, operations for data transformation, including export/import processing, are semi-automated so that targeted content can be automatically imported into a different application/service in a contextual manner that best correlates the data to a presentation style of a different electronic document. As a non-limiting example, an adapted user interface may provide a user interface element that, when activated, enables automated detection of specific types of content to correlate with an electronic document provided by a different application/service. Selection of that adapted user interface element enables automatic detection of content and correlation with one or more other electronic documents, ultimately leading to the ability to semi-automate processing for a user to select specific portions of content, which is a trigger for automatic data transformation of that content for presentation in the different electronic document. For instance, data in a first type of electronic document (e.g., message, email, collaborative message network space, social networking posting, etc.), may be correlated with a second type of electronic document (e.g., word processing document, spreadsheet document, presentation document, notes document), where a user interface prompt can be automatically generated that enables initiation of automated transfer of some or all of identified content to the second electronic document. In some alternative examples, a selection of a user interface element may not be required to initiate detection of content and correlation of content with another electronic document. A selection of an adapted user interface feature for processing described herein may be a trigger for initiating a user interface experience to automatically transfer content between electronic documents.

Real-time (or near real-time) processing enables application/services to continuously provide tailored user experiences, where user interfaces may be adapted to reflect a context that a specific user is working with. Processing device views that illustrate non-limiting user interface examples of the present disclosure are provided in FIGS. 3A-3H. Such processing device views provide visual examples of how a user interface is adapted and improved over traditional user interfaces that are not configured to intelligently generate and apply data transformation suggestions.

Exemplary technical advantages provided by processing described in the present disclosure comprise but are not limited to: enhancement of processing efficiency during application/service usage (real-time or near real-time) to create data transformation suggestions and automatically apply data transformations on content on behalf of a user; improved processing efficiency (e.g., reduction in processing cycles, saving resources/bandwidth) for computing devices for data transformation of content and generation of presentation documents from the transformed content; adapting and improving front-end user to provide new functionality for semi-automated data transformation and automated application of data transformations; improved intelligence (e.g., (AI)) applied to contextually transform content for presentation in a different electronic document as well as correlate content from one electronic document with that of another electronic document; extensibility to tailor processing operations described herein across a plurality of different applications/services including expanding scope and resources across a software application/service platform that provides functionality and interfacing across a plurality of application/services; reduction in latency in presentation document creation/modification; and improving usability of applications/services, among other technical advantages.

FIG. 1 illustrates an exemplary process flow 100 providing exemplary components for automated data transformation of content for presentation as described herein, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure. Moreover, process flow 100 describes components that may be utilized to execute methods 200 and 250 (FIGS. 2A and 2B, respectively) as well as provide user interface examples illustrated and described in FIGS. 3A-3H and the accompanying description.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or modify an electronic document) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and an application/service component 104, one or more application/services that are used to execute any type of task including document creation and/or modification. An application/service that the user is accessing is configured to provide a user interface or graphical user interface (GUI) that enables access to and creation/modification of electronic documents. Exemplary functionality described herein including an improved user interface may be provided through an application/service component 104 that is configured to enable applications/services to be accessed by users and presented on a user computing device 102. An example user interface may be adapted to provide functionality described herein where user interface features and application command control is achieved to foster creation and management of data transformation suggestions and an ability to automatically apply data transformation suggestions through new user interface features that are not present in traditional user interface systems. Intelligent processing operations are described herein that enhance the process of generating data transformations and providing visual representation of data transformations through an adapted user interface. Processing device views that illustrate non-limiting user interface examples of the present disclosure are provided in FIGS. 3A-3H.

An electronic document (or electronic file) is a representation of content in an electronic media/electronic format such as a digital file. Examples of electronic documents may vary where files may be created to work with any type of application/service and in any type of file format as known to one skilled in the field of art. For instance, an electronic document may be created for a word processing service, notetaking service, slide-based presentation service, etc., where the electronic document may comprise authored content. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content. As a non-limiting example, an electronic document may be a word processing document, where access is provided through a word processing application/service, distributed storage, etc. In that example, content of the word processing document may be evaluated and transformed into slide-based presentation content that is part of a slide-based presentation document offered through a slide-based presentation application/service.

As referenced above, exemplary applications/services may interface with other components of process flow 100 to enhance processing efficiency and functionality as described herein. The application/service component 104 is configured to interface with other components of process flow 100 including computing device(s) 102 and the document transformation component 106. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of an application platform providing a suite of productivity applications/services. An application platform suite is configured to providing access to a plurality of applications/services, thereby enabling cross-application/service usage to enhance functionality of a specific application/service at run-time. Moreover, specific application/services as well as application platform suites (e.g., software application platform providing correlated access to a plurality of applications/services) may be configured to interface with other non-proprietary application/services (e.g., third-party applications/services) to extend functionality including data transformation and associated implementation.

As referenced in the foregoing, the application/service component 104 is configured to interface with the document transformation component 106. In doing so, signal data may be collected by either: the application/service component 104; or the document transformation component 106 via the application/service component 104, to enable contextual processing of user access to an electronic document through one or more applications/services. Access to an electronic document may be an indication that data transformation suggestions are to be generated and presented in real-time, near real-time or created and stored (locally or over a distributed storage) for subsequent access usage. In one example, a framework for the application/service may be coded to detect user access and selection of user interface elements, etc., and respond accordingly. In other examples where the document transformation component 106 is configured for detecting access through an application/service, an API or listener component may be utilized to trigger analysis of content of the electronic document. In some cases, the application/service component 104 is managing a user interaction with a single application/service and in other instances the application/service component 104 is managing a user interaction with multiple applications/services. Access to an electronic document may be an indication that data transformation suggestions are to be generated and presented in real-time, near real-time or created and stored (locally or over a distributed storage) for subsequent access usage. As an example, detected access to the electronic document may be occurring in real-time by a user through the application/service, where analysis of content of the electronic document may occur in real-time as well.

The application/service component 104 is configured to present an adapted user interface that provides user interface elements to manage data transformation interactions. For instance, a user interface element may be configured to initiate generation of data transformation suggestions based on the content of an electronic document that is being accessed. An application command control (e.g., user interface ribbon) may be adapted to include a selectable user interface feature to initiate generation of data transformation suggestions. In another example, a user interface ribbon may have a selectable menu feature that reveals a sub-menu providing a user interface feature to initiate generation of data transformation suggestions. In yet another example, an application/service may be configured to receive voice input, which may be a trigger for generation of data transformation suggestions. Alternatively, the application/service component 104 may be configured to interface with the document transformation component 106 to identify a command (e.g., via a selected user interface element) through another application/service for initiation of data transformation suggestion generation. Non-limiting visual examples of user interface elements to initiate generation of data transformation suggestions are provided in FIGS. 3A-3H.

Additionally, an adapted user interface may comprise a user interface menu that provides management for generated data transformation suggestions. Completion of generation of data transformation suggestions may be a trigger for launch of the user interface menu. The user interface menu is configured to automatically present data transformation suggestions for transforming content of an electronic document (e.g., an electronic document that is being accessed) into a presentation document that presents the content in a different manner from the way that the content is presented in the electronic document. Essentially, the tailored user interface menu for management of data transformation suggestions provides users with the ability to review and confirm pre-populated suggestions that is derived from contextual analysis of the electronic document.

An example user interface menu for management of data transformation suggestions may comprise but is not limited to: selectable user interface features for selecting candidate slides that are pre-populated with slide titles based on determined sections of an electronic document; and selectable user interface features for sub-content of the candidate slides that are pre-populated with content based on ranking of importance of the individual content portions within determined sections of the electronic document. Non-limiting visual examples of a user interface menu are provided in the FIGS. 3C-3E. Designation of content portions into candidate slides and sub-content for candidate slides through contextual analysis provides a higher level of intelligence and practical application as compared with general AI that may be utilized for presentation generation. That is, trained machine learning modeling 108, that is implemented by the document transformation component 106, may provide a higher level of analysis than traditional AI, where the machine learning modeling of the present disclosure is configured to determine importance and relevance of specific portions of content for organization into a hierarchical template (e.g., slides and sub-content such as bullet points)

that can be utilized to create a presentation document. This provides a better starting point for a user when a presentation document is being created because the user can easily re-arrange candidate slide suggestions, select/de-select specific portions of content and/or candidate slides, re-arrange individual portions of content, add new slides/sub-content, etc., all without having to edit an already created presentation document that does not truly align with what the user was thinking.

Selectable user interface features for candidate slides may comprise specific content from the electronic document that is identified as being worthy as having its own slide based on results of the trained machine learning modeling 108. For example, a determined section in a word processing document may be set as title of a slide, where specific individual portions of content within that determined content may be designated as sub-content (e.g., bullet points) for that title slide. As not all pre-populated suggestions may be appreciated by a user, the user interface menu provides the user with the ability to modify a template before a presentation document is generated. In one example, results of machine learning modeling 108 may create a representation of the user interface menu that pre-selects, on behalf of a user, some but not all of the selectable user interface features for candidate slides and/or sub-content of the candidate slides. This may occur based on ranking of importance of content of the electronic document (e.g., the individual content portions) as subsequently described.

The user interface menu may further comprise selectable user interface features that enable automated generation of a presentation document from the templatized selections made by the user through the user interface menu. When a presentation document is to be generated, the application/service component 104 interfaces with the document transformation component 106 to enable launching of a second electronic document (e.g., presentation document) and/or a different application/service to present the second electronic document. That is, the application/service component 104 is configured to manage states of applications/services to improve processing efficiency and usability of its applications/services.

The document transformation component 106 is one or more components configured to manage generation of data transformation suggestions and interfacing with other components such as the application/service component 104, machine learning modeling 108 and knowledge repositories 110, which are utilized to enhance document transformation suggestion generation. The data transformation component 106 may further be configured to monitor interaction with user interface features of an application/service, for example, to modify and update presentation of user interface menus based on a contextual change in content of the electronic document that is being utilized to generate a presentation document.

Data transformation suggestions may be automatically generated by the document transformation component 106 based on execution of programmed code that tailored to evaluate content and metadata of an electronic document, trained machine learning modeling, or a combination thereof. In one example, data transformation suggestions are automatically provided, on behalf of a user, through the new user interface menu of an application/service in which the electronic document is displayed. In another example, the document transformation component 106 is configured to manage its own application/service that displays the user interface menu during simultaneous access to an electronic document that is presented through a different application/service. In any example, machine learning modeling is created and trained to organize content of an electronic document and rank the content for importance so that hierarchical designations of specific content can be achieved.

Data that may be utilized to generate data transformation suggestions may comprise but is not limited to: content and metadata of one or more electronic documents; collected signal data (e.g., from usage of an application/service, device-specific, user-specific); telemetry data including past usage of a specific user and/or group of users; a corpus of training data used to build and train a machine learning modeling; and web-based resources, among other examples. Data such as collected signal data, telemetry data and web-based resource data may be utilized to enhance importance ranking for specific contextual scenarios including user-specific preferences, optimization of presentation content for device-specific scenarios, suggesting additional content to include in presentation documents, and/or identifying data that can be utilized to adapt a user interface menu to enhance suggestions based on received user feedback. That is, these ancillary types of data can be utilized to help train machine learning modeling to intelligently evaluate importance of content and how to organize content for presentation as data transformation suggestions.

In execution, generation of data transformation suggestions may include a plurality of processing operations that comprise but are not limited to: determining a document type for an electronic document; detecting heading information for the content of the electronic document; determining sections of the electronic document based on the detected heading information; determining keywords in heading information; extracting content portions from the determined sections; determining keywords in individual content portions; ranking importance of individual content portions within the determined sections; and generating the data transformation suggestions based on the determined sections, the ranking of importance of the individual content portions within the determined sections and applied intelligence gained through training and support data (e.g., collected signal data, telemetry data, data from web-based resources).

Machine learning modeling 108 may be executed to enhance generation of data transformation suggestions and executing of importance ranking of content of one or more electronic documents for collectively determining which content portions should be incorporated into the data transformation suggestions. Creation, training and update of a machine learning modeling 108 is known to one skilled in the field of art. In examples of the present disclosure, known examples of machine learning modeling is adapted to generate and expose an intelligent learning model for execution of the processing operations described herein. In doing so, the intelligent learning model is created, trained and implemented, to correlate content portions of electronic documents with hierarchical classifications for presentation (e.g., content that is a candidate for its own slide, content that is best used as sub-content for a slide, whether content portions can be omitted from the data transformation suggestions). For example, one or more layers of abstraction may be applied during the machine learning modeling 108, where the one or more layers of abstraction correlate content portions with specific classifications of data transformation suggestions.

In further examples, machine learning modeling 108 is created and trained to identify keyword phrases, from content portions of an electronic document, that are then plugged into a search query to obtain links to related documents. Further related documents are then parsed for these keywords and relevant content sections are then presented through a user interface, which enables user to easily drag and drop related content into their presentation documents for further enhancement. Furthermore, data transformation processing may be configured to automatically add citations on behalf of a user where appropriate. Documents searched and accessed to find related content, provide citations, etc., are not limited to a specific document type.

While some examples extend to specific creation of slide-based presentation documents, functionality of the document transformation component 106 is also extensible to manage correlation of content between different electronic documents for semi-automating import/export processing. As referenced above, the present disclosure also extends to examples where data is being exported from one electronic document and imported into another, for example, in the same form that the data existed in the first electronic document. The document transformation component 106 may further be configured to correlate content of one electronic document with data fields of another electronic document in which the content can be imported. Visual examples of back-end processing by the document transformation component 106 is illustrated in FIGS. 3G and 3H. The document transformation component 106 may be configured to execute processing operations described in method 250 (FIG. 2B). In such technical instances, the document transformation component 106 may be configured to: detect a user interface selection for exporting content to another electronic document; detect formatting, layout and content from an electronic document that content is being exported from; correlating detected content with another electronic document; detecting formatting and layout and content of an electronic document in which content is going to be imported; generating candidate suggestions for content that is to be imported into a second electronic document; providing a user interface menu for presentation of the candidate suggestions; and managing import/export of content to update presentation of an electronic document through a user interface. In such instances, separate programmed code and/or trained machine learning modeling may be created and managed from that in specifically targeted for creation of presentation documents (e.g., slide-based presentation documents).

In any example in which machine learning modeling is utilized, the document transformation component 106 interfaces with a plurality of knowledge repositories 110. Knowledge repositories 110 may comprise knowledge data that is used to execute any processing operations for the document transformation component 106. Knowledge repositories 110 may be accessed to obtain data for generation, training and implementation of machine learning modeling 108. Knowledge resources comprise any data affiliated with a software application platform (e.g., Microsoft®, Google®, Apple®, IBM®) as well as data that is obtained through interfacing with resources over a network connection including third-party applications/services. Examples of data maintained by knowledge repositories 110 comprises but is not limited to: collected signal data (e.g., from usage of an application/service, device-specific, user-specific); telemetry data including past usage of a specific user and/or group of users; a corpus of training data used to build and train a machine learning modeling; web-based resources including any data accessible via network connect; and application/service data (e.g., data of applications/services managed by the application/service component 104) for execution of specific applications/services including electronic document metadata, among other examples.

Machine learning modeling 108 may be configured to train and employ a ranker. The ranker is configured to score the importance of content for inclusion in the data transformation suggestions. In doing so, the ranker may be configured to utilize a corpus of training data, including data managed by the knowledge repositories, as inputs to execute a scoring that ranks individual content portions of an electronic document. Ranking processing, ranking methodologies (including classification and regression analysis) and implementation of an exemplary ranker is known to one skilled in the field of art. Above what is known, the machine learning modeling 108 may be trained and tested to generate confidence scoring for, individually or in combination, any of: importance of content portion to an entire electronic document; importance of content portion to an individual section of content; importance of headings relative to one another (e.g., for ordering of slide suggestions); importance of keywords in specific content portions; completeness of content portions (e.g., completion of statements, sentences); and user-specific value assessment for specific content portions, among other examples. In examples where a ranker is configured for import/export processing, the ranker may be trained and tested to generate confidence scoring for, individually or in combination, any of: correlation between electronic documents; correlation between individual content portions of one electronic document with data fields of another electronic document; correlation between keywords in an electronic document (e.g., message subject, message body) with data fields and/or content in another electronic document; completeness of content portions (e.g., completion of statements, sentences); and user-specific value assessment for specific content portions, among other examples. Confidence scoring be utilized to rank/prioritize an order that data transformations suggestions are provided to a user through the user interface menu. In further examples, developers may implement weighting to emphasize priority of specific aspects of ranking processing over others, where developers can assign different weights to different types of inputs to generate tailored ranking processing.

The document transformation component 106 is further be configured to interface with the application/service component 104 to present data transformation suggestions in a user interface menu configured for providing the data transformation suggestions. Ranked results, provided by the ranker, may be utilized to determine how to present data transformation suggestions in an example user interface menu that is configured to provide data transformation suggestions. For example, the document transformation component 106 may arrange the data transformation suggestions into groupings that comprise but are not limited to: data transformation suggestions that are assigned as candidate slides; and data transformation suggestions that are assigned as sub-content of the candidate slides. Data transformation suggestions that are assigned as candidate slides may be associated with slide numbering for a user to identify that the content has been identified as content worthy of being a slide in a slide-based presentation. Furthermore, the data transformation suggestions that are assigned as candidate slides may be pre-populated with slide titles based on the determined sections of the electronic document and results of importance ranking processing. Additionally, the data transformation suggestions that are assigned as candidate slides may comprise associated user interface features that enable users to select/de-select candidate slides as well as user interface features to present a collapsible view of sub-content of a candidate slide. The data transformation suggestions that are assigned as sub-content of candidate slides may comprise associated user interface features that enable users to select/de-select of specific portions of sub-content. In addition to selecting/de-selecting specific items in a user interface menu, the document transformation component 106 further enables functionality so that the user may reorganize specific items displayed in a user interface menu (e.g., move a candidate slide position and/or re-arrange an ordering of sub-content of a candidate slide).

In some examples, the document transformation component 106 may be configured with threshold levels of confidence scoring to determine one or more of the following: whether to include specific content portions as a data transformation suggestion; whether to classify a candidate data transformation suggestion as a candidate slide or sub-content of a candidate slide; and whether to pre-select (or not select) certain selectable items displayed in an automatically displayed representation of a user interface menu. For example, a threshold confidence level (indicating importance of a content portion from the machine learning modeling 108) may be set that, if met, would automatically select specific data transformations suggestions for inclusion in a generated presentation document. Selectable user interface features for data transformation suggestions would be pre-selected upon automatic generation of the user interface menu that provides a templatized hierarchical representation of data transformation suggestions. If a threshold confidence level is not satisfied, then the document transformation component 106 may display a suggestion for addition to a presentation document but not automatically select a specific data transformation suggestion, ultimately leaving it up to the user to decide whether to include a specific data transformation suggestion in a presentation document.

Moreover, an example user interface menu configured for providing the data transformation suggestions may further comprise user interface features to enable a user to add slides or sub-content to the templatized hierarchical representation of data transformation suggestions. This may be optional in some representations, but further enables a user to customize a presentation document before generation. In some examples, selection of a feature to add content to presentation template may result in the launch of an additional user interface feature (e.g., pane or menu) that presents related content for inclusion when a presentation document is to be generated.

Additionally, as referenced in the foregoing, the user interface menu providing data transformation suggestions may further comprise a user interface element to trigger generation of a presentation document based on the selected data transformation suggestions. Selection of such a user interface feature triggers generation of a presentation document based on the selected data transformation suggestions in the template provided through the user interface menu as well as automatic launching of a new electronic document (e.g., presentation document). In some examples, the new electronic document is automatically launched in a different application/service than the application/service used to display a first electronic document. For instance, a slide-based presentation document may be created from a word processing document, presented in a word processing application/service, and the slide-based presentation document is automatically launched in a slide-based presentation application/service. In examples where the document transformation component 106 is updating an electronic document through import/export processing, the document transformation component 106 may be configured to launch an electronic document, in which content is being imported to, in a new application/service and also present a user interface menu to select specific types of content to import into that electronic document either in a user interface of the new application/service or a user interface of the application/service that the content is being exported from.

The document transformation component 106 is further configured to interface with a design service to aid in generating a presentation document (e.g., slide-based presentation document). The design application/service may be configured to add design elements to enhance the presentation document, where the document transformation component 106 is configured to automatically select specific designs elements to incorporate into a generated presentation document on behalf of a user. A user may select a templatized representation of content for presentation through the user interface menu, but the document transformation component 106 further transforms content for presentation by utilizing its processing capabilities to automatically incorporate design elements into a presentation document. An example design service may be incorporated within an existing application/service, be a separate application/service incorporated into a software application platform or a third-party application/service. For example, a design application/service may be a web-based resource accessed as part of a knowledge repository 110 that is accessed at a time when a presentation document is to be generated. Examples of design elements that may be automatically incorporated into a presentation document comprise but are not limited to: design themes; backgrounds; transitions between portions of content (e.g., slides); effects for transitions; animations; and content to select for addition (e.g., image content added to presentation documents), among other examples.

The document transformation component 106 may utilize data from evaluation of an electronic document to automatically select design elements to incorporate into a presentation document. Non-limiting examples of types of data from evaluation of an electronic document comprises: keywords; type of document, user-specific preferences, ranking of content for candidate slide suggestions and past usage data (of a specific user and/or a group of users), any or all of which can be utilized to select any of the design elements to apply and find related content for inclusion in a presentation document. For example, confidence scoring related to importance of keywords, from extracted content of an electronic document, as well as classification of the type of electronic document may be utilized to select a theme and/or background for a presentation document. In another example, keywords extracted from an electronic document and a classification of a type of the electronic document may be utilized to search, for relevant content to enhance a presentation document via any of: web-based resources; associated content storages (e.g., clipart databases) for an application/service; other application/services; and a combination thereof, among other examples. The document transformation component 106 may execute similar types of selection of the above identified design elements based on any combination of the above identified types of data identified from evaluation of an electronic document. Selected design elements may be incorporated into a generated presentation document, for example, that is presented through a user interface of an application/service in response to selection of a user interface element for generating a presentation document.

Moreover, processing operations of the document transformation component 106 may be written into the coding of an application/service, where an application/service may be adapted to implement functionality described in the present disclosure. In another example, processing by the document transformation component 106 106 may be executed by a stand-alone application/service that is configured to interface with the application/service component 104 to provide customized application experiences. For example, an application/service for management data transformation suggestions may interface with a software application platform providing an application platform suite of productivity applications/services, where generated presentation documents can be tailored to the specific context of a user workflow. In such an example, the document transformation component 106 may interface with the application/service component 104 through an API.

FIGS. 2A-2B illustrates exemplary methods 200 and 250, respectively, related to automated data transformation provided through an improved user interface, with which aspects of the present disclosure may be practiced. Processing operations described in methods 200 and 250 may be executed by components described in process flow 100 (FIG. 1), where the detailed description in process flow 100 supports and supplements the recited processing operations in methods 200 and 250. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
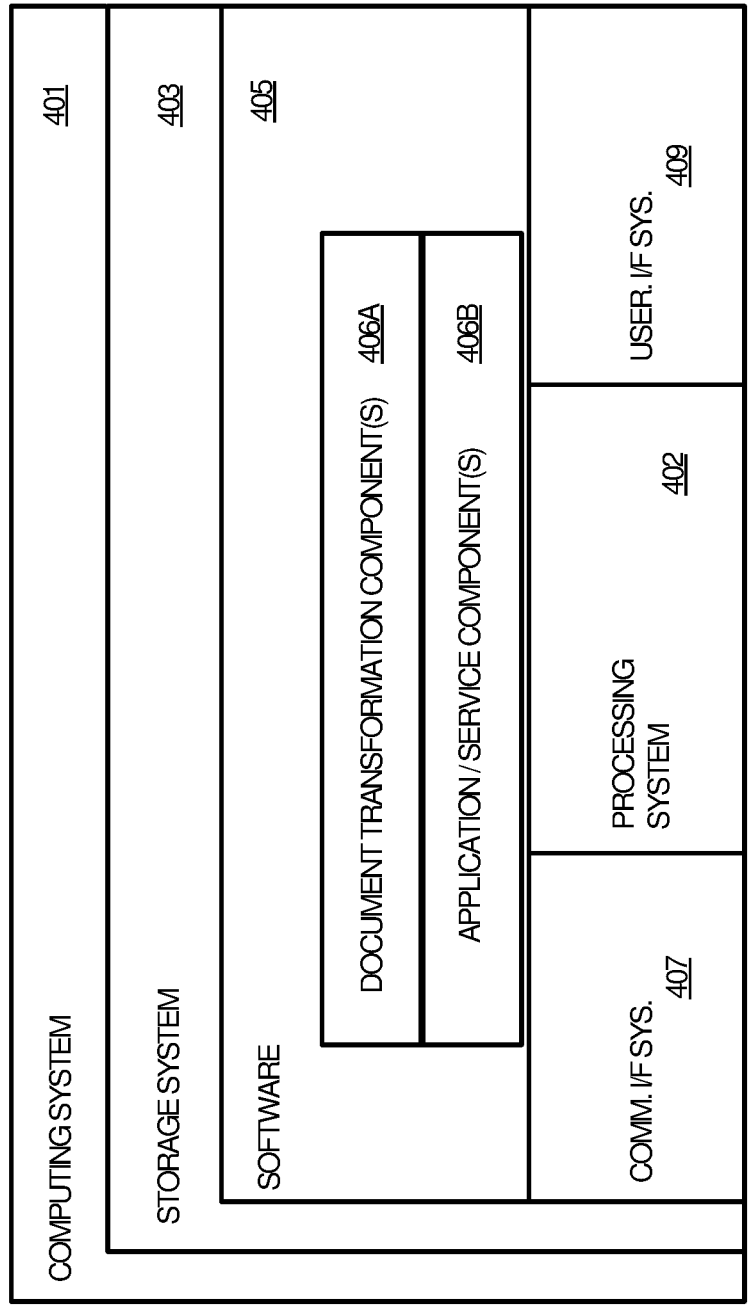
FIG. 4 illustrates a computing system suitable for implementing processing operations described herein related to automated data transformation and presentation of content, with which aspects of the present disclosure may be practiced.

As an example, methods 200 and 250 may be executed across an exemplary computing system (or computing systems) as described in the description of FIG. 4. Exemplary components, described in methods 200 and 250, may be hardware and/or software components, which are programmed to execute processing operations described herein. Operations performed in methods 200 and 250 may correspond to operations executed by a system and/or service that execute computer programs, software agents, intelligent bots, application programming interfaces (APIs), neural networks and/or machine-learning processing, among other examples. In some examples, processing operations described in methods 200 and 250 may be executed by one or more applications/services associated with a web service that has access to a plurality of application/services, devices, knowledge resources, etc. In one instance, processing operations described in methods 200 and 250 may be implemented by one or more components connected over a distributed network.

Method 200 begins at processing operation 202, where user access to an electronic document is detected. As an example, user access to an electronic document may be detected based on interaction between a user computing device and an application/service that is utilized to work with the electronic document. Examples of electronic documents and user access to electronic documents has been described in the foregoing description including the description of process flow 100 (FIG. 1). Access to an electronic document may be an indication that data transformation suggestions are to be generated and presented in real-time, near real-time or created and stored (locally or over a distributed storage) for subsequent access usage. As an example, detected access to the electronic document may be occurring in real-time by a user through the application/service, where analysis of content of the electronic document may occur in real-time as well.

Flow of method 200 may proceed to processing operation 204, where a user interface selection is received through a user interface of an application/service, to trigger generation of data transformation suggestions. For instance, a user interface element may be configured to initiate generation of data transformation suggestions based on the content of an electronic document that is being accessed. An application command control (e.g., user interface ribbon) may be adapted to include a selectable user interface feature to initiate generation of data transformation suggestions. In another example, a user interface ribbon may have a selectable menu feature that reveals a sub-menu providing a user interface feature to initiate generation of data transformation suggestions. In yet another example, an application/service may be configured to receive voice input, which may be a trigger for generation of data transformation suggestions. Alternatively, the application/service component 104 may be configured to interface with the document transformation component 106 to identify a command (e.g., via a selected user interface element) through another application/service for initiation of data transformation suggestion generation. Non-limiting visual examples of user interface elements to initiate generation of data transformation suggestions are provided in FIGS. 3A-3H.

In response to receiving a user interface selection to initiate generation of data transformation suggestions, flow of method 200 may proceed to processing operation 206. At processing operation 206, data transformation suggestions are generated. Generation (processing operation 206) of data transformation suggestions has been described in the foregoing description including the description of process flow 100 (FIG. 1). Example processing operations executed during generation (processing operation 206) of data transformation suggestions comprise but are not limited to: determining a document type for an electronic document; detecting heading information for the content of the electronic document; determining sections of the electronic document based on the detected heading information; determining keywords in heading information; extracting content portions from the determined sections; determining keywords in individual content portions; ranking importance of individual content portions within the determined sections; and generating the data transformation suggestions based on the determined sections, the ranking of importance of the individual content portions within the determined sections and applied intelligence gained through training and support data (e.g., collected signal data, telemetry data, data from web-based resources).

Completion of generation of data transformation suggestions may be a trigger for automatic presentation of the data transformation suggestions in a user interface menu that is configured to provide the data transformation suggestions. At processing operation 208, a user interface menu that is configured to provide the data transformation suggestions is automatically presented through a user interface. Automated presentation of an example user interface menu has been described in the foregoing description including the description of process flow 100 (FIG. 1). An example user interface menu for management of data transformation suggestions may comprise but is not limited to: selectable user interface features for selecting candidate slides that are pre-populated with slide titles based on determined sections of an electronic document; and selectable user interface features for sub-content of the candidate slides that are pre-populated with content based on ranking of importance of the individual content portions within determined sections of the electronic document. Non-limiting visual examples of a user interface menu are provided in the FIGS. 3C-3E.

The user interface menu may further comprise selectable user interface features that enable automated generation of a presentation document from the templatized selections made by the user through the user interface menu. In one example, the user interface menu providing the data transformation suggestions comprises: selectable user interface features for selecting candidate slides that are pre-populated with slide titles based on determined sections within the electronic document, and selectable user interface features for sub-content of the candidate slides that are pre-populated with content based on a ranking of importance of the individual content portions within the determined sections.

Selectable user interface features for candidate slides may comprise specific content from the electronic document that is identified as being worthy as having its own slide based on results of the trained machine learning modeling as described in the foregoing description. In one example, results of machine learning modeling may be utilized to create a representation of the user interface menu that pre-selects, on behalf of a user, some but not all of the selectable user interface features for candidate slides and/or sub-content of the candidate slides. This may occur based on ranking of importance of content of the electronic document (e.g., determined sections and individual content portions) as previously described.

Flow of method 200 may proceed to decision operation 210. At decision operation 210, it is determined whether any of the selectable user interface features are toggled by a user. Examples of toggling may comprise, selecting/de-selecting selectable user interface features, collapsing view of hierarchical representations of content, adding new slides/content to assist with automated generation of a presentation document, and re-organizing positioning of candidate slides and/or sub-content. In examples where user interface features are not toggled, flow of decision operation 210 branches NO and processing of method 200 proceeds to decision operation 214. In examples where user interface features are toggled, flow of decision operation 210 branches YES and processing of method 200 proceeds to processing operation 212. At processing operation 212, a presentation of the user interface menu is updated to reflect the toggled changes made by a user.

Flow of method may proceed to decision operation 214. At decision operation 214, it is determined whether a selection of a user interface feature to initiate presentation generation is made by a user through the user interface menu. In examples where no selection is made, flow of decision operation 214 branches NO and processing of method 200 proceeds remains idle until further action is received. In examples where a selection is made to initiate presentation generation, flow of decision operation 214 branches YES and processing of method 200 proceeds to processing operation 216.

At processing operation 216, a presentation document is generated based on a received selection of the user interface feature to initiate presentation generation. Generation of a presentation document has been described in the foregoing description including the description of process flow 100 (FIG. 1). At processing operation 218, a presentation document may be automatically launched in a different application/service from that in which the original electronic document is displayed. For example, a presentation document may be generated from an word processing document, accessed through a word processing application/service, where the presentation document is a slide-based presentation document that is launched and displayed in a slide-based presentation application/service. Non-limiting visual user interface examples related to a generated presentation document are presented in FIG. 3F. Flow of method 200 may then remain idle until subsequent processing is received from a user.

Turning attention to method 250 non-limiting examples described herein extend to those where an improved user interface is configured to surface representations of back-end processing, which correlates data in one electronic document with data of another electronic document. This enables content to be intelligently exported from one electronic document and imported into another electronic document in a contextual manner that the content is adapted for presentation in a different application/service. In such examples, operations for data transformation, including export/import processing, are semi-automated so that targeted content can be automatically imported into a different application/service in a contextual manner that best correlates the data to a presentation style of a different electronic document. As a non-limiting example, an adapted user interface may provide a user interface element that, when activated, enables automated detection of specific types of content to correlate with an electronic document provided by a different application/service. Selection of that adapted user interface element enables automatic detection of content and correlation with one or more other electronic documents, ultimately leading to the ability to semi-automate processing for a user to select specific portions of content, which is a trigger for automatic data transformation of that content for presentation in the different electronic document. For instance, data in a first type of electronic document (e.g., message, email, collaborative message network space, social networking posting, etc.), may be correlated with a second type of electronic document (e.g., word processing document, spreadsheet document, presentation document, notes document), where a user interface prompt can be automatically generated that enables initiation of automated transfer of some or all of identified content to the second electronic document. In some alternative examples, a selection of a user interface element may not be required to initiate detection of content and correlation of content with another electronic document. A selection of an adapted user interface feature for processing described herein may be a trigger for initiating a user interface experience to automatically transfer content between electronic documents.

Method 250 begins at processing operation 252, where a user interface selection is made to export detected content from one electronic document to another electronic document. An example user interface feature may be selected from an adapted user interface of an application/service that is configured to present a menu for converting data from one electronic document to another electronic document. For example, an application command control (e.g., application control ribbon) may comprise a user interface features that enables content to be automatically prepared for export and subsequently imported to another electronic document. Non-limiting examples of a user interface feature configured to present a menu for converting are illustrated in FIGS. 3G and 3H, among other portions of the present disclosure.

Flow of method 250 may proceed to processing operation 254, where detected content from an electronic document is correlated with content of another electronic data. This processing may automatically initiate based on the trigger of selecting a user interface feature that initiates automated export of content to be imported to another electronic document. Processing for detection of content and correlation of content between electronic documents has been described in the foregoing description including the description of process flow 100 (FIG. 1). As described the foregoing description, a document transformation component 106 (FIG. 1) may be configured to correlate content of one electronic document with data fields of another electronic document in which the content can be imported. In such technical instances, the document transformation component 106 may be configured to: detect a user interface selection for exporting content to another electronic document; detect formatting, layout and content from an electronic document that content is being exported from; correlating detected content with another electronic document; detecting formatting and layout and content of an electronic document in which content is going to be imported, among other examples.

At processing operation 256, candidate suggestions are generated from the detected content for export. Candidate suggestions comprise data, identified from a first electronic document, that matches data fields/content in another electronic document based on the correlation processing of the electronic documents. For example, data described in a specific format in an email may correlate with specific data fields in a spreadsheet document. Identifying this correlation helps determine that a user may wish to incorporate that data within the spreadsheet document without having to copy and paste the data into individual spreadsheet cells. Generation of candidate suggestions for importing/exporting content may comprise executing trained machine learning modeling (e.g., machine learning modeling 108 of FIG. 1) that ranks a correlation between content/metadata of one electronic document and content/metadata, including data fields, of another electronic document. In doing so, machine learning modeling may be trained to rank a correlation between electronic documents and/or specific content portions of electronic documents based on an evaluation of: content and metadata of one or more electronic documents; collected signal data (e.g., from usage of an application/service, device-specific, user-specific); telemetry data including past usage of a specific user and/or group of users; a corpus of training data used to build and train a machine learning modeling; web-based resources; and any combination thereof. Data such as collected signal data, telemetry data and web-based resource data may be utilized to enhance importance ranking for specific contextual scenarios including user-specific preferences, optimization of presentation content for device-specific scenarios, suggesting additional content to include in presentation documents, and/or identifying data that can be utilized to adapt a user interface menu to enhance suggestions based on received user feedback.

Once candidate suggestions are generated for import/export, flow of method 250 may proceed to processing operation 258. At processing operation 258, a tailored user interface menu configured for presentation of the candidate suggestions is then generated. Generation of candidate suggestions may occur through processing of a document transformation component 106, as described in the foregoing description including the description of process flow 100 (FIG. 1). The document transformation component 106 is configured to interface with an application/service to enable the generated candidate suggestions to be surfaced in a customized user interface menu that is presented in an adapted user interface of an application/service.

Completion of generation of the candidate suggestions may be a trigger for automatically displaying the user interface menu, including technical scenarios where a new application/service is launched to display an electronic document in which data is to be exported to. In some alternate examples, confidence scoring, generated based on machine learning modeling, may not be able to clearly identify what electronic document a user would like to import data to. For instance, confidence scoring may be utilized to rank and prioritize content candidate suggestions for display. If a confidence scoring threshold is not achieved, content may not be presented as part of the candidate suggestions. In other examples, confidence scoring may indicate that content may be correlated with more than one electronic document and a clear indication is not determined which the user may prefer to import to initiate automated transfer of content. In such instances, a user interface menu may be adapted to present an additional screen allowing the user to disambiguate between multiple electronic documents.

Flow may proceed to processing operation 260, where a user interface menu providing a user interface menu user interface menu configured for presentation of the candidate suggestions. An example user interface menu provides a user with selectable user interface features to select specific portions of content the user wishes to import to an electronic document, where automated processing may be executed to import all of the selected content portions to an electronic document at the same time. The user interface menu may further comprise a user interface feature to initiate the automated import/export of content to an electronic document.

Method 250 may proceed to decision operation 262, where it is determined whether a selection is made of candidate suggestions for export. Selection of that adapted user interface element enables automatic detection of content and correlation with one or more other electronic documents, ultimately leading to the ability to semi-automate processing for a user to select specific portions of content, which is a trigger for automatic data transformation of that content for presentation in the different electronic document. In examples where no selection is made, decision operation 262 branches NO and processing of method 250 remains idle until further user action is taken. In examples where a selection is made for one or more selectable user interface features, flow of decision operation 262 branches YES and processing of method 250 proceeds to processing operation 264. The user may then select a user interface feature, from the user interface menu, to initiate automated transfer of content to a destination electronic document. In some alternative examples, selectable user interface features for candidate suggestions may be pre-selected on behalf of a user. In this case, a user may proceed to select a feature to initiate automated transfer of content to a destination electronic document.

At processing operation 264, an electronic document is launched, where the electronic document is populated with content of the candidate selections. As described in the foregoing description, launching of an electronic document may comprise automatically launching a different application/service that is configured to present the type of electronic document that content is being exported to. Processing of method 250 may then be idle until further user action is taken.

FIG. 3A presents processing device view 300, illustrating an interaction with a user, through a user computing device, and an exemplary productivity service. Processing device view 300 illustrates display of an electronic document 302 through a productivity application/service (e.g., word processing application/service). In the example shown in processing device view 300, the user is accessing a word processing document 302 that comprises content for a project proposal. As an example, the word processing document 302 may be comprise 20 pages of content that outlines a collaborative project proposal that a user may need to generate a presentation for. Traditionally, the user would have to manually launch a presentation application/service and manually execute operations to create a slide-based presentation through numerous manual operations to copy/paste content from the word processing document 302 to the slide-based presentation. In the example show, a user interface application command control for the word processing application/service is modified to include a user interface menu option 304 that presents user interface features to enable automated presentation conversion. Selection of the user interface menu option 304 may trigger update of a user interface to display a user interface feature 306 that, when selected, automatically initiates processing to generate data transformation suggestions for transforming content of the word processing document 302 to a slide-based presentation document.

Figure 3B:
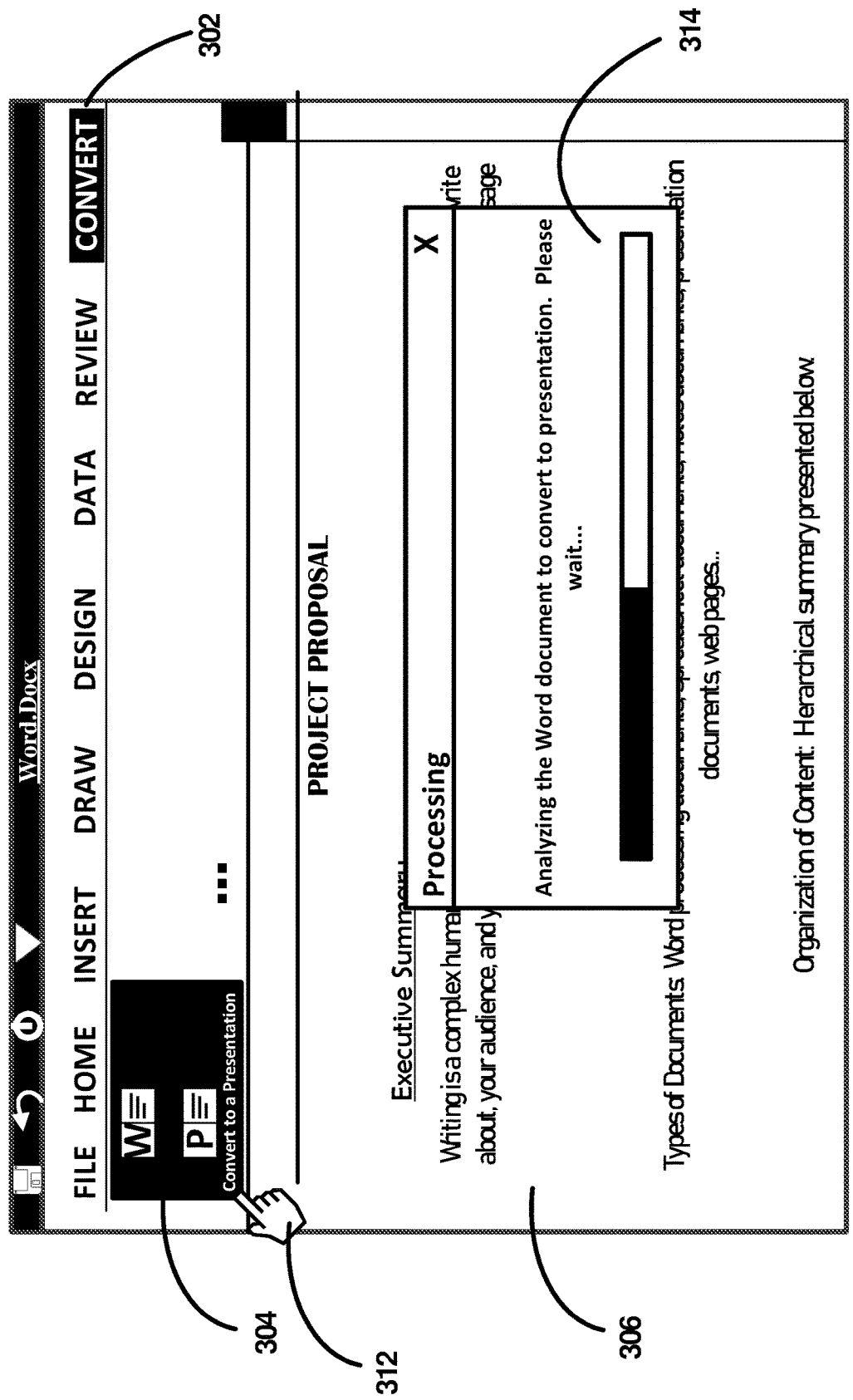

FIG. 3B presents processing device view 310, illustrating another example of an interaction with a user, through a user computing device, and an exemplary productivity service. In one instance, processing device 310 is a continued example, from processing device view 300 (FIG. 3A), where a user executes a selection action 312 that selects the user interface menu option 304 to automatic generation of data transformation suggestions for transforming content of the word processing document 302 to the slide-based presentation document. As an example, the selection action 312 triggers update of the user interface of the word processing application/service to launch a user interface informational update 314. The user interface information update 314 details progress of automated generation of the data transformation suggestions while back-end processing is occurring to generate the data transformation suggestions and an adapted user interface menu for presentation of the data transformation suggestions.

Figure 3C:
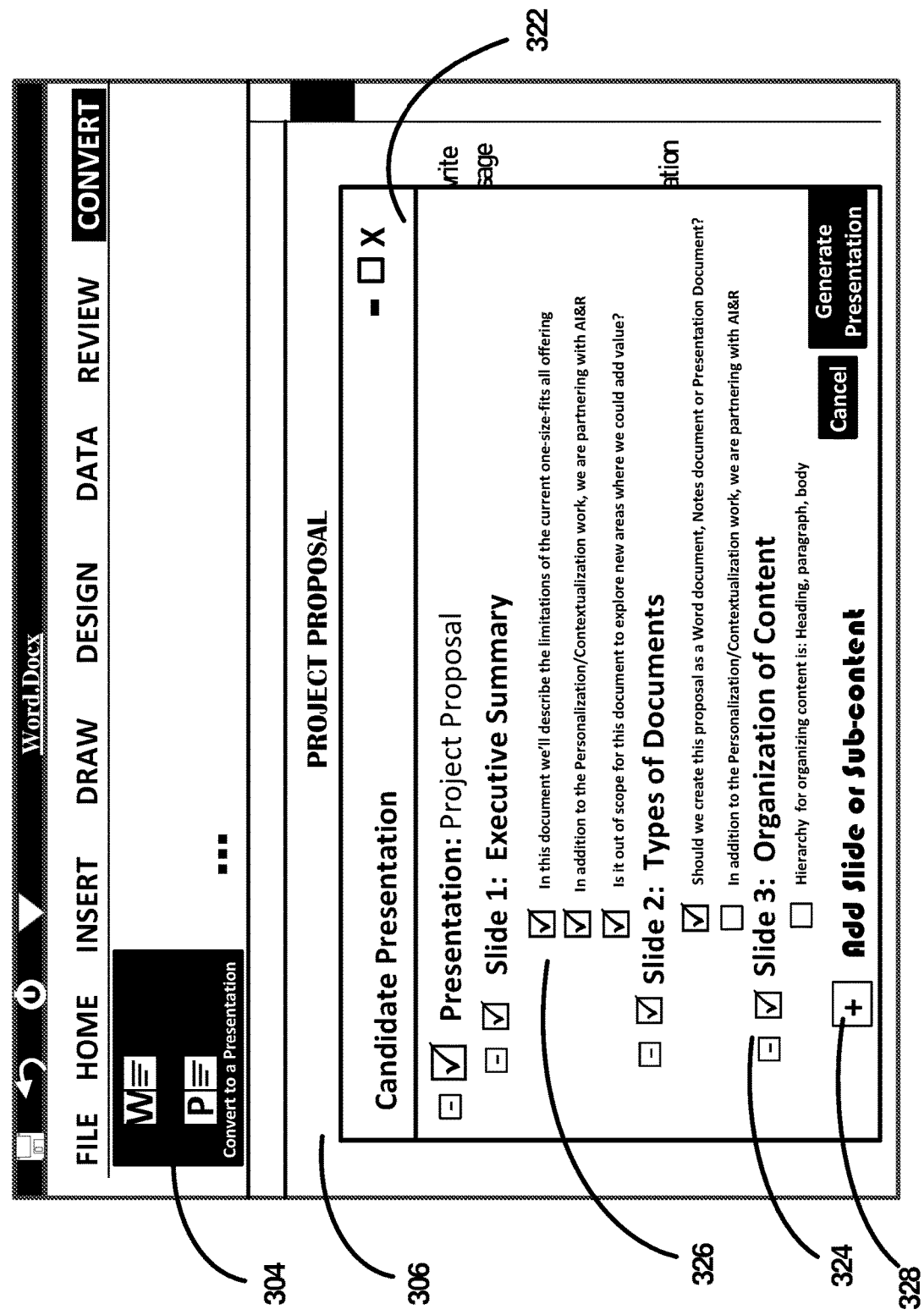
Figure 3H:
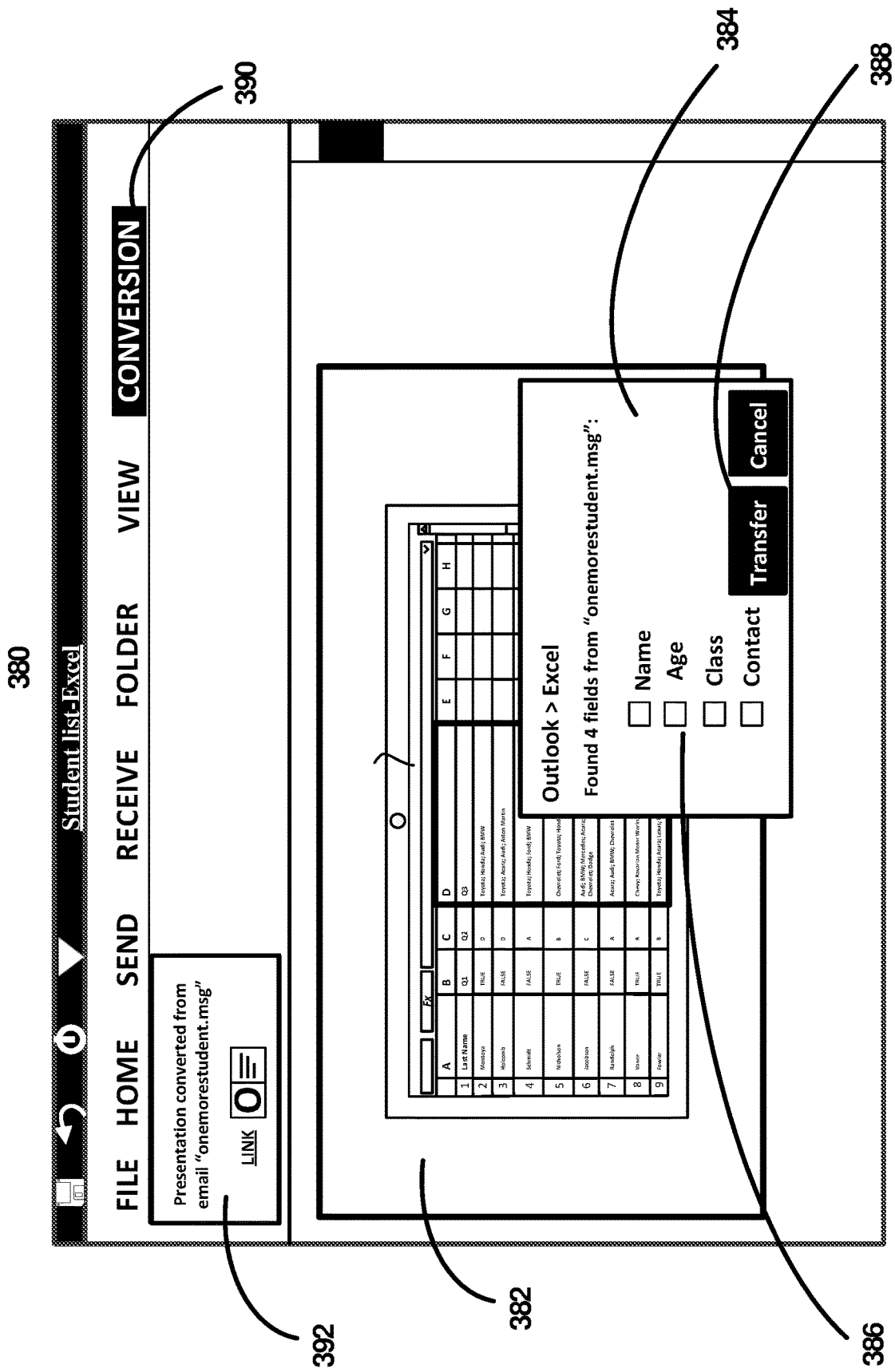

FIG. 3C presents processing device view 320, illustrating another example of an interaction with a user, through a user computing device, and an exemplary productivity service. In one instance, processing device 320 is a continued example, from processing device view 310 (FIG. 3B), where a user interface menu 322, configured to provide data transformation suggestions, is automatically presented though a user interface. Processing device view 320 provides a visual example of a user interface menu 322, functionality of which has been previously described in the foregoing description including the description of process flow 100 (FIG. 1), method 200 (FIG. 2A) and method 250 (FIG. 2B). User interface menu 322 comprises selectable user interface features 324 for candidate slides, where content from the word processing document 306 is utilized to generate candidate slides and present the generated candidate slides in the templatized user interface menu 322. The user interface menu 322 further comprises selectable user interface features 326 for sub-content of candidate slides. Moreover, results of processing, by the document transformation component 106, may result in some of the selectable user interface features being pre-selected for a user upon initial generation of the user interface menu 322. Additionally, the user interface menu 322 may comprise a selectable user interface feature 328 configured for adding content to a generated presentation document, where content may comprise additional slide content and/or slide sub-content.

FIG. 3D presents processing device view 330, illustrating another example of an interaction with a user, through a user computing device, and an exemplary productivity service. In one instance, processing device 330 is a continued example, from processing device view 320 (FIG. 3C), where a user is toggling features of the user interface menu 322. For example, a user makes a first user interface selection 332 that re-orders sub-content of slide 1 ("Executive Summary"), switching the first sub-content (e.g., to be represented as a bullet point on a generated slide) of candidate "slide 1" with the third sub-content bullet point, as compared with the user interface representation of the user interface menu illustrated in processing device view 320 (FIG. 3C). In a second example of user interaction with the user interface menu 322, a second user interface selection 334 is made that de-selects a sub-content suggestion for candidate "slide 2" (Types of Documents) as compared with the user interface representation of the user interface menu illustrated in processing device view 320 (FIG. 3C).

FIG. 3E presents processing device view 340, illustrating another example of an interaction with a user, through a user computing device, and an exemplary productivity service. In one instance, processing device 340 is a continued example, from processing device view 330 (FIG. 3D), where a user is done toggling features of the user interface menu 322 and proceeds to select a user interface feature 342 that is configured to generate presentation of a presentation document. Optionally, the user interface menu 322 may further comprise a user interface feature 344 that is configured to cancel the presentation document generation process. Processing device view 340 illustrates a user selection action 346, where the user selects the user interface feature 342 that is configured to generate presentation of a presentation document. This processing triggers automated generation of a presentation document based on the selected data transformation suggestions.

FIG. 3F presents processing device view 350, illustrating another example of an interaction with a user, through a user computing device, and an exemplary productivity service. In one instance, processing device 350 is a continued example, from processing device view 340 (FIG. 3E), where a slide-based presentation application/service is automatically launched to display a generated presentation document based on the selected data transformation suggestions made through the user interface menu 322 (FIG. 3E). The generated presentation document 352 is displayed in a first user interface pane of the slide-based application/service. In a second user interface pane of the slide-based application/service, a preview 354 is presented of the generated presentation document that shows the slide content included in the presentation document so that a user does not have to click through the entire presentation to access specific slide content.

The user interface of the slide-based application/service is further adapted with a user interface menu option 304 that presents user interface features to enable linking back to original electronic document that content was retrieved from to create the presentation document. Selection of the user interface menu option 356 automatically initiates display of user interface feature 358 that links the generated presentation document with the original word processing document (Project Proposal 302). This enables the user to utilize the user interface to quickly access that word processing document upon selection of the user interface feature 358, which is especially useful in later usage situations where the original word processing document is not open simultaneously with a generated presentation document and the user wishes to link back to the word processing document.

FIG. 3G presents processing device view 360, illustrating another example of an interaction with a user, through a user computing device, and an exemplary productivity service. Processing device view 360 illustrates an adapted user interface of an email application/service that enables semi-automated import/export conversion processing to be initiated through user interface selection. The user interface of the email application/service is adapted with a user interface menu option 362 that presents user interface features to enable automated presentation conversion. User action 366 may be received that selects user interface feature 364 from of the user interface menu option 362, which initiates automated processing to export data from an email message of the email application/service. In alternate examples where different applications/services are working with different types of content, it is to be understood that user interface feature 364 may be modified to reflect the contextual instance that the user may be working with. Selection of user interface feature 364 may be correlated with specific content that the user is working with in the email application/service, for example, an email 368 that is actively being accessed through the email application/service. In such instances, a document transformation component 106 (FIG. 1) may be configured to detect specific content that a user is actively accessing, which is useful when an application/service such as an email application/service is working with a plurality of emails (e.g., in an inbox of a user). As can be seen in processing device view 360, content 370 of the email 368 is presented in a fuller view in a second pane of the email application/service.

FIG. 3H presents processing device view 380, illustrating another example of an interaction with a user, through a user computing device, and an exemplary productivity service.

In one instance, processing device 380 is a continued example, from processing device view 360 (FIG. 3G), where selection of user interface feature 364 results in back-end processing that launches a spreadsheet application/service to import data from the email 368 (FIG. 3G) into a spreadsheet document 382. Launch of the spreadsheet document 382 also triggers presentation of a user interface menu 384 configured to present candidate suggestions for importing content from the email 368 into the spreadsheet document 382. The user interface menu 384 presents selectable user interface features 386 that enable a user to select specific content it wishes to import into the spreadsheet document 382. In some examples, the selectable user interface features 386 may be pre-selected for a user, for example, based on correlation ranking executed by a document transformation component 106 (FIG. 1). The user interface menu 384 may further comprise a selectable user interface feature 388 to trigger automated import/export processing of content based on selected candidate suggestions. Selection of user interface feature 388 triggers automated processing that imports data associated with selected candidate suggestions into the spreadsheet document 382, while keeping a formatting of data fields within the spreadsheet document 382.

In processing device view 380, the user interface of the spreadsheet application/service is further adapted with a user interface menu option 390 that presents user interface features to enable linking back to the original email that content is being exported from. Selection of the user interface menu option 390 automatically initiates display of user interface feature 392 that links the generated spreadsheet document 382 with the original email 368. This enables the user to utilize the user interface to quickly access that email 368 upon selection of the user interface feature 392, which is especially useful in later usage situations where the original email 368 is not open simultaneously with the spreadsheet document 382 and the user wishes to link back to the email content 370.

FIG. 4 illustrates a computing system 401 suitable for implementing processing operations described herein related to automated data transformation and presentation of content, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components 406 that are configured as relevance suggestion component(s) executing processing operations as described herein including identification and presentation of contextually relevant productivity features for user access to an electronic document. In some examples, computing system 401 may be a device that a user utilizes to access an application/service in which contextually relevant suggestions are surfaced. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute exemplary process flow 100 (FIG. 1) including processing of associated components as well as methods 200 and 250 (FIGS. 2A-2B), where processing operations may be specifically executed that are related to data transformation and presentation of content such as the content is tailored for presentation in a different application/service, as described in the foregoing description.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for document transformation components 406a, application/service components 406b (e.g., of a software application platform), and other service-based components, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving a selection, from a user interface of an application or service, of a user interface element configured to initiate generation of data transformation suggestions based on content of an electronic document;
in response to the selection of the user interface element, automatically applying a trained machine learning model that generates data transformation suggestions for the electronic document based on execution of processing operations that comprise:
detecting heading information for the content of the electronic document,
determining sections of the electronic document based on a detection of the heading information,
ranking importance of the sections determined for the electronic document,
extracting individual content portions from the sections,
ranking importance of specific content of individual content portions, within the sections, to the sections of the electronic document, and
generating the data transformation suggestions that comprise:
candidate slide suggestions generated based on the ranking of importance of the sections of the electronic document and
sub-content suggestions for each of the candidate slide suggestions generated based on the ranking of importance of the specific content of the individual content portions to the sections;
generating, based on an analysis result of the trained machine learning model, a user interface menu that comprises:
the plurality of candidate slide suggestions,
the plurality of sub-content suggestions for the candidate slide suggestions, and
a plurality of selectable user interface features configured for user confirmation of the plurality of candidate slide suggestions and the plurality of sub-content suggestions, wherein the generating of the user interface menu further comprises automatically pre-selecting some but not all of the plurality of selectable user interface features based on a threshold evaluation of the ranking of importance of the sections and the ranking of importance of the specific content of individual content portions; and
prior to generating a slide deck presenting slides for the slide-based presentation, automatically presenting, in the user interface of the application or service, the user interface menu.

2. The method of claim 1, wherein the user interface menu providing the data transformation suggestions is automatically presented through the user interface of the application or service in response to the selection of the user interface element.

3. The method of claim 1, wherein the application or service is a word processing application or service, and wherein the electronic document is a word processing document.

4. The method of claim 1, further comprising: receiving, through the user interface of the application or service, user input that comprises one or more of: a selection and de-selection of at least one of a selection and a de-selection of one or more of the plurality of selectable user interface features; and updating presentation of the user interface menu based on the user input received.

5. The method of claim 1, wherein generating of the user interface menu comprises positioning individual selectable user interface features, of the plurality of selectable user interface features, next to each of the plurality of candidate slide suggestions and the plurality of sub-content suggestions, and wherein the automatically pre-selecting selects some but not all of the individual selectable user interface features.

6. The method of claim 1, wherein the generating of the user interface menu is executed by the trained machine learning model, and wherein the trained machine learning model is configured to execute the threshold evaluation used to automatically pre-select some but not all of the plurality of selectable user interface features.

7. The method of claim 1, further comprising: generating a slide deck presenting slides for the slide-based presentation based on selections confirmed by the user via the user interface menu; presenting the slide deck in a graphical user interface of a different application or service; and presenting, through the graphical user interface of the different application or service, a selectable user interface feature that, when selected, provides a link that automatically returns to the electronic document displayed through the user interface of the application or service.

8. A system comprising:
at least one processor; and
a memory, operatively connected with the at least one processor, storing computer-executable instructions that, when executed by the at least one processor, causes the at least one processor to execute a method that comprises:
automatically applying a trained machine learning model that generates data transformation suggestions for the electronic document based on execution of processing operations that comprise:
detecting heading information for the content of the electronic document,
determining sections of the electronic document based on a detection of the heading information,
ranking importance of the sections determined for the electronic document,
extracting individual content portions from the sections,
ranking importance of specific content of individual content portions, within the sections, to the sections of the electronic document, and
generating the data transformation suggestions that comprise:
candidate slide suggestions generated based on the ranking of importance of the sections of the electronic document and
sub-content suggestions for each of the candidate slide suggestions generated based on the ranking of importance of the specific content of the individual content portions to the sections;
generating, based on an analysis result of the trained machine learning model, a user interface menu that comprises:
the plurality of candidate slide suggestions,
the plurality of sub-content suggestions for the candidate slide suggestions and
a plurality of selectable user interface features configured for user confirmation of the plurality of candidate slide suggestions and the plurality of sub-content suggestions, wherein the generating of the user interface menu further comprises automatically pre-selecting some but not all of the plurality of selectable user interface features based on a threshold evaluation of the ranking of importance of the sections and the ranking of importance of the specific content of individual content portions; and
prior to generating a slide deck presenting slides for the slide-based presentation, transmitting, to the application or service, data for rendering the user interface menu.

9. The system of claim 8, wherein the method, executed by the at least one processor, further comprises: detecting access to the electronic document in real-time by the user, and wherein the automatically applying of the trained machine learning model occurs based on the detecting of the access to the electronic document.

10. The system of claim 8, wherein the method, executed by the at least one processor, further comprises: receiving an indication of a selection of a user interface element configured to initiate generation of data transformation suggestions for the electronic document, and wherein the user interface menu is automatically presented through a user interface of the application or service in response to a receipt of the indication of the selection of the user interface element configured to initiate generation of data transformation suggestions.

11. The system of claim 8, wherein the method, executed by the at least one processor, further comprises: receiving an indication of a selection of a user interface element configured to automatically generate a slide-based presentation document; automatically generating the slide-based presentation document based on selections received of the plurality of selectable user interface features that are selected within a presentation of the user interface menu; and automatically launching, in a different application or service, the slide-based presentation document based on the indication of the selection of the user interface element configured to automatically generate a slide-based presentation document.

12. The system of claim 11, wherein the application or service is a word processing application or service, wherein the electronic document is a word processing document, and wherein the different application or service is a slide-based presentation application or service.

13. The system of claim 8, wherein generating of the user interface menu comprises positioning individual selectable user interface features, of the plurality of selectable user interface features, next to each of the plurality of candidate slide suggestions and the plurality of sub-content suggestions, and wherein the automatically pre-selecting selects some but not all of the individual selectable user interface features.

14. The system of claim 8, wherein the generating of the user interface menu is executed by the trained machine learning model, and wherein the trained machine learning model is configured to execute the threshold evaluation used to automatically pre-select some but not all of the plurality of selectable user interface features.

15. A computer-readable storage media storing computer-executable instructions that, when executed by at least one processor, causes the at least one processor to execute a method comprising:
receiving, from an application or service, an indication of a selection of a user interface element configured to initiate generation of data transformation suggestions for content of an electronic document;
in response to receiving the indication of the selection of the user interface element, automatically generating data transformation suggestions for the electronic document based on an application of a trained machine learning modeling that executes processing operations that comprise:
detecting heading information for the content of the electronic document, determining sections of the electronic document based on a detection of the heading information, ranking importance of the sections determined for the electronic document, extracting individual content portions from the sections, ranking importance of specific content of individual content portions, within the sections, to the sections of the electronic document, and generating the data transformation suggestions that comprise:

candidate slide suggestions generated based on the ranking of importance of the sections of the electronic document and sub-content suggestions for each of the candidate slide suggestions generated based on the ranking of importance of the specific content of the individual content portions to the sections;

generating, based on an analysis result of the trained machine learning model, a user interface menu that comprises:

the plurality of candidate slide suggestions, the plurality of sub-content suggestions for the candidate slide suggestions and a plurality of selectable user interface features configured for user confirmation of the plurality of candidate slide suggestions and the plurality of sub-content suggestions, wherein the generating of the user interface menu further comprises automatically pre-selecting some but not all of the plurality of selectable user interface features based on a threshold evaluation of the ranking of importance of the sections and the ranking of importance of the specific content of individual content portions; and prior to generating a slide deck presenting slides for the slide-based presentation, transmitting, to the application or service, data for rendering the user interface menu.

16. The computer-readable storage media of claim 15, wherein the transmitting of the data for rendering user interface menu automatically occurs based on a completion of the generating of the data transformation suggestions.

17. The computer-readable storage media of claim 15, wherein the method further comprising: receiving, through the user interface menu, a selection of a user interface element configured to automatically generate a slide-based presentation document; automatically generating the slide-based presentation document based on selections of the plurality of selectable user interface features within the user interface menu; and automatically transmitting, to a different application or service, the slide-based presentation document based on the selection of the user interface element configured to automatically generate a slide-based presentation document.

18. The computer-readable storage media of claim 17, wherein the application or service is a word processing application or service, wherein the electronic document is a word processing document, and wherein the different application or service is a slide-based presentation application or service.

19. The computer-readable storage media of claim 15, wherein generating of the user interface menu comprises positioning individual selectable user interface features, of the plurality of selectable user interface features, next to each of the plurality of candidate slide suggestions and the plurality of sub-content suggestions, and wherein the automatically pre-selecting selects some but not all of the individual selectable user interface features.

20. The computer-readable storage media of claim 15, wherein the generating of the user interface menu is executed by the trained machine learning model, and wherein the trained machine learning model is configured to execute the threshold evaluation used to automatically pre-select some but not all of the plurality of selectable user interface features.

* * * * *